United States Patent
Ichikawa et al.

(10) Patent No.: US 9,876,362 B2
(45) Date of Patent: Jan. 23, 2018

(54) POWER TRANSFER SYSTEM

(71) Applicant: MURATA MANUFACTURING CO., LTD., Nagaokakyo-shi, Kyoto-Fu (JP)

(72) Inventors: Keiichi Ichikawa, Nagaokakyo (JP);
Shinji Goma, Nagaokakyo (JP);
Tsuyoshi Suesada, Nagaokakyo (JP);
Henri Bondar, Kyoto (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 958 days.

(21) Appl. No.: 14/250,656

(22) Filed: Apr. 11, 2014

(65) Prior Publication Data

US 2014/0300201 A1    Oct. 9, 2014

Related U.S. Application Data

(63) Continuation of application No. PCT/JP2012/079323, filed on Nov. 13, 2012.

(30) Foreign Application Priority Data

Nov. 14, 2011 (JP) ................................ 2011-248747

(51) Int. Cl.
*H02J 5/00* (2016.01)
*H02J 50/05* (2016.01)

(52) U.S. Cl.
CPC ............... *H02J 5/00* (2013.01); *H02J 5/005* (2013.01); *H02J 50/05* (2016.02)

(58) Field of Classification Search
CPC .............. H02J 5/00; H02J 5/005; H02J 50/05
(Continued)

(56) References Cited

U.S. PATENT DOCUMENTS 3,938,018 A * 2/1976 Dahl ................... B60L 11/1812
                                                        320/139
6,173,899 B1 * 1/2001 Rozin .................. G06K 7/0008
                                                        235/449

(Continued)

FOREIGN PATENT DOCUMENTS

CN    102239619 A    11/2011
JP    2007-252027 A    9/2007

(Continued)

OTHER PUBLICATIONS

PCT/JP2012/079323 ISR dated Feb. 19, 2013.

*Primary Examiner* — Daniel Kessie
(74) *Attorney, Agent, or Firm* — Arent Fox LLP

(57) ABSTRACT

A capacitance (Cp) is a capacitance formed between a transmitting-device-side passive electrode and a receiving-device-side passive electrode. A capacitance (Ca) is a capacitance formed between a transmitting-device-side active electrode and a receiving-device-side active electrode. A bridge circuit formed by Z1 to Z4 is connected to a secondary side of a step-up transformer, where Z1 represents an impedance of a first element, Z2 represents an impedance of a second element, Z3 represents an impedance of a series circuit formed by the capacitance (Ca) and a load, and Z4 represents an impedance of the capacitance (Cp). By determining the impedances Z1 to Z4 such that this bridge circuit is balanced, a potential at a receiving-device-side reference potential point is made equal to a ground potential. This reduces variation in receiving-device-side reference potential, reduces noise, and stabilizes the operation of a load circuit on the receiving device side.

17 Claims, 41 Drawing Sheets

(58) Field of Classification Search
USPC .......................................................... 307/104
See application file for complete search history.

(56) References Cited

U.S. PATENT DOCUMENTS

| | | | |
|---|---|---|---|
| 6,844,702 B2 * | 1/2005 | Giannopoulos | H02J 7/025 |
| | | | 320/108 |
| 8,476,789 B2 | 7/2013 | Ichikawa et al. | |
| 8,536,739 B2 | 9/2013 | Ichikawa et al. | |
| 8,587,157 B2 | 11/2013 | Camurati et al. | |
| 8,907,526 B2 * | 12/2014 | Harakawa | H02J 5/005 |
| | | | 307/104 |
| 2009/0302690 A1 * | 12/2009 | Kubono | H02J 17/00 |
| | | | 307/109 |
| 2011/0080135 A1 * | 4/2011 | Bland | H02J 17/00 |
| | | | 320/101 |
| 2012/0068550 A1 * | 3/2012 | Boer | H02J 7/025 |
| | | | 307/104 |
| 2013/0234532 A1 | 9/2013 | Fells et al. | |

FOREIGN PATENT DOCUMENTS

| | | |
|---|---|---|
| JP | 2009-531009 A | 8/2009 |
| JP | 2012-050314 A | 3/2012 |
| WO | WO-2010-150317 A1 | 12/2010 |
| WO | WO-2012/086411 A1 | 6/2012 |

\* cited by examiner

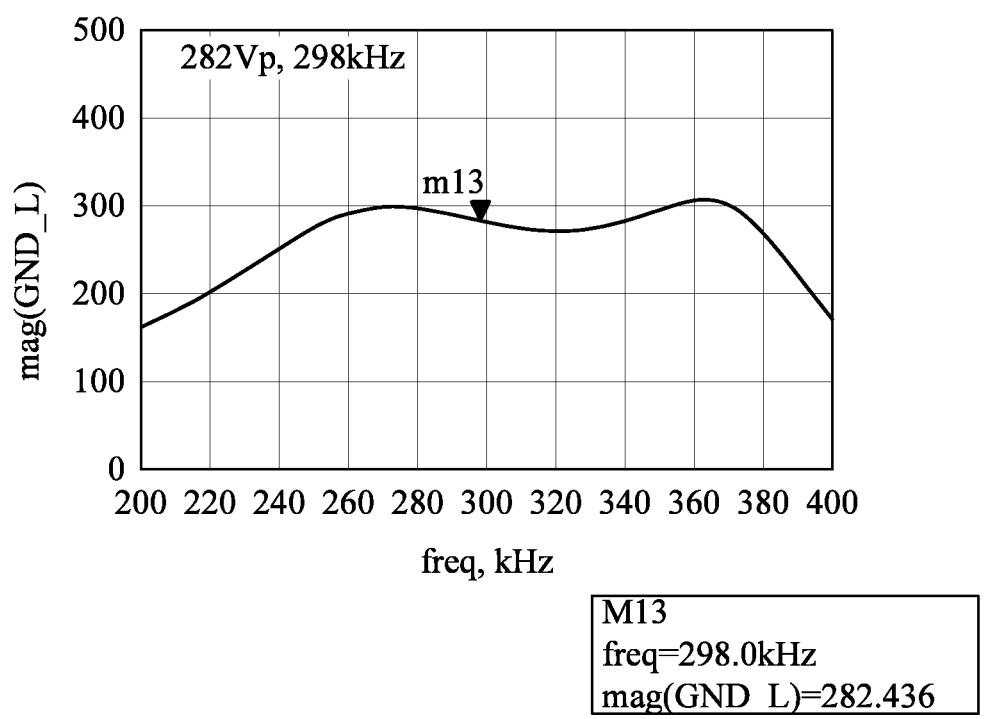

POWER TRANSFER SYSTEM

CROSS REFERENCE TO RELATED APPLICATIONS

The present application is a continuation of International application No. PCT/JP2012/079323, filed Nov. 13, 2012, which claims priority to Japanese Patent Application No. 2011-248747, filed Nov. 14, 2011, the entire contents of each of which are incorporated herein by reference.

FIELD OF THE INVENTION

The present invention relates to a power transfer system that transfers power by means of capacitive coupling (electric field coupling).

BACKGROUND OF THE INVENTION

Patent Document 1 is disclosed as a system that transfers power by means of capacitive coupling.

The power transfer system described in Patent Document 1 includes a power transmitting device and a power receiving device. The power transmitting device includes a high-frequency high-voltage generator, a passive electrode, and an active electrode. The power receiving device includes an high-frequency high-voltage load, a passive electrode, and an active electrode.

FIG. 33A illustrates a basic configuration of the power transfer system described in Patent Document 1. FIG. 33B illustrates a basic configuration of another system that transfers power by means of capacitive coupling. The power transmitting device includes a high-frequency high-voltage generator 1, a passive electrode 2, and an active electrode 3. The power receiving device includes a high-frequency high-voltage load 5, a passive electrode 7, and an active electrode 6. The active electrode 3 of the power transmitting device and the active electrode 6 of the power receiving device are placed close to each other with a gap 4 therebetween, so that the two electrodes are capacitively coupled to each other.
Patent Document 1: Japanese Unexamined Patent Application Publication (Translation of PCT Application) No. 2009-531009

SUMMARY OF THE INVENTION

The power transfer systems having a capacitive coupling structure illustrated in FIGS. 33A and 33B are advantageous in that the amount of power transferred per unit area is large, and that the degree of positional freedom within the mount surface is high. However, electric field noise tends to occur because a high voltage is applied to the passive electrode of the power receiving device during power transfer. Additionally, if a ground potential of the receiving device varies on the basis of earth ground, a load circuit of the receiving device may malfunction during power transfer, for example, in a device touched by a person, such as a touch panel. Therefore, it is important to reduce the voltage of the passive electrode during power transfer.

An object of the present invention is to provide a power transfer system that reduces variation in receiving-device-side reference potential to reduce noise, and stabilizes the operation of a load circuit on the receiving device side.

A power transfer system according to the present invention includes a power transmitting device having a transmitting-device-side first electrode, a transmitting-device-side second electrode, and a feeding circuit configured to feed an alternating voltage between the transmitting-device-side first electrode and the transmitting-device-side second electrode; and a power receiving device having a receiving-device-side first electrode, a receiving-device-side second electrode, and a load circuit configured to receive an alternating voltage generated between the receiving-device-side first electrode and the receiving-device-side second electrode. In the power transfer system, a receiving-device-side reference potential point is connected to a reference potential of the receiving device, the receiving-device-side reference potential point being a node between the load circuit and the receiving-device-side second electrode or being a midpoint of the load circuit; the power transmitting device includes a series circuit between the transmitting-device-side first electrode and the transmitting-device-side second electrode such that a first element is connected to the transmitting-device-side first electrode, the series circuit being formed by the first element and a second element connected in series; a transmitting-device-side reference potential point is connected to a reference potential of the transmitting device, the transmitting-device-side reference potential point being a node between the first element and the second element of the series circuit; and the series circuit is provided such that a balance condition $Z1 \times Z4 = Z2 \times Z3$ is satisfied or can be nearly satisfied at a fundamental frequency of the alternating voltage, where $Z1$ represents an impedance of the first element, $Z2$ represents an impedance of the second element, $Z3$ represents an impedance of a series circuit including a capacitance formed between the transmitting-device-side first electrode and the receiving-device-side first electrode and the load circuit, and $Z4$ represents an impedance including a capacitance formed between the transmitting-device-side second electrode and the receiving-device-side second electrode.

The second element of the series circuit preferably has a capacitance connected or formed between the transmitting-device-side second electrode and the transmitting-device-side reference potential point; and the balance condition can be preferably nearly satisfied by making a voltage ratio $V1/V0$ less than 1, where $V0$ is a voltage generated between the reference potential of the transmitting device and the reference potential of the receiving device when the capacitance is shorted, and $V1$ is a voltage generated between the reference potential of the transmitting device and the reference potential of the receiving device when the capacitance is opened. With this configuration, it is possible to reduce variation in receiving-device-side reference potential, reduce noise, and stabilize the operation of the load circuit on the receiving device side.

The reference potential on the transmitting device side is preferably a (DC or AC) ground potential (earth potential). With this configuration, it is possible to stabilize the reference potential on the transmitting device side and the reference potential on the receiving device side. It is also possible to reduce noise superimposed on the receiving device.

A capacitance is preferably connected or formed between the transmitting-device-side reference potential point and the receiving-device-side reference potential point. This can stabilize the receiving-side reference potential.

The feeding circuit may include an alternating voltage generating circuit, and a transformer having a primary winding connected to the alternating voltage generating circuit and a secondary winding connected between the transmitting-device-side first electrode and the transmitting-device-side second electrode; the secondary winding may have a lead terminal configured to form a first secondary winding between the transmitting-device-side first electrode and the lead terminal, and form a second secondary winding between the transmitting-device-side second electrode and the lead terminal; the impedance of the first element may be formed by an impedance of the first secondary winding and an impedance of a first capacitor connected in parallel with the first secondary winding; and the impedance of the second element may be formed by an impedance of the second secondary winding and an impedance of a second capacitor connected in parallel with the second secondary winding. Thus, it is possible to stabilize the receiving-side reference potential while reducing the number of necessary elements.

The lead terminal may be a center tap (Tc) of the secondary winding; and the secondary winding may have a first lead terminal (T1) of the first secondary winding, and a second lead terminal (T2) of the second secondary winding. The power transfer system may further include a connection switching circuit (S1) configured to switch connection of the transmitting-device-side reference potential point to the center tap and one of the first lead terminal and the second lead terminal. Thus, it is possible to stabilize the receiving-side reference potential while reducing the number of necessary elements.

The feeding circuit may include an alternating voltage generating circuit, and a transformer having a primary winding connected to the alternating voltage generating circuit and a secondary winding connected between the transmitting-device-side first electrode and the transmitting-device-side second electrode; the secondary winding may have a lead terminal configured to form a first secondary winding between the transmitting-device-side first electrode and the lead terminal, and form a second secondary winding between the transmitting-device-side second electrode and the lead terminal; the impedance of the first element may be formed by an impedance of the first secondary winding; and the impedance of the second element may be formed by an impedance of the second secondary winding. The power transfer system may further include an inductor inductively coupled to part of the first secondary winding, and a capacitor connected to the inductor. Thus, it is possible to vary the impedance Z1 and stabilize the receiving-side reference potential.

The feeding circuit may include an alternating voltage generating circuit, a transformer having a primary winding connected to the alternating voltage generating circuit and a secondary winding connected between the transmitting-device-side first electrode and the transmitting-device-side second electrode, and a series connection circuit formed by a first inductor and a second inductor and connected in parallel with the secondary winding of the transformer; the impedance of the first element may be formed by an impedance of the first inductor; and the impedance of the second element may be formed by an impedance of the second inductor. The power transfer system may further include a third inductor inductively coupled to part of the first inductor, and a capacitor connected to the third inductor.

The impedance (Z1) of the first element is preferably formed by a fixed impedance (Cx) and a variable impedance (Zx) connected in parallel with the fixed impedance (Cx); the impedance (Z2) of the second element is preferably formed by a fixed impedance (Cy) and a variable impedance (Zy) connected in parallel with the fixed impedance (Cy); and the variable impedances (Zx, Zy) are preferably set such that the balance condition is satisfied at the fundamental frequency. With this configuration, it is possible to stabilize the receiving-side reference potential and reduce variation in characteristics.

The impedances Z1, Z2, Z3, and Z4 are preferably set such that the balance condition is satisfied at a third harmonic frequency of the alternating voltage. Thus, it is possible to reduce the effect of third harmonic and stabilize the receiving-side reference potential.

The power transfer system preferably further includes, at the transmitting-device-side reference potential point (TG), a circuit for injecting a cancellation signal that reduces components caused by deviation from the balance condition. Thus, even if there is a deviation from the balance condition Z1×Z4=Z2×Z3, a noise component caused by the deviation can be easily cancelled. Also, the cancellation of the noise component can be actively controlled in accordance with changes in the degree of coupling between the transmitting device and the receiving device, load variation, and the like.

According to the present invention, the voltages of the transmitting-device-side passive electrode and the receiving-device-side passive electrode can be reduced. This can reduce field radiation noise from the power transmitting device and the power receiving device. Since the reference potential on the receiving device side can be brought closer to the earth ground, it is possible to stabilize the operation of the load circuit on the receiving device side during power transfer.

For example, even when the load circuit of the power receiving device has a capacitive touch panel, accurate detection can be achieved. For example, when there is a radio communication circuit, the degradation of receiving sensitivity can be reduced.

BRIEF DESCRIPTION OF THE DRAWINGS

FIG. 15B is a diagram showing a frequency characteristic of a potential of the receiving-device-side passive electrode of a power transfer system not having an adjustment alternating-current source illustrated in FIG. 14.

DETAILED DESCRIPTION OF THE PREFERRED EMBODIMENTS

First Embodiment

A configuration of a power transfer system according to a first embodiment will be described with reference to FIGS. 1A and 1B to FIGS. 4A and 4B.

Figure 1A:
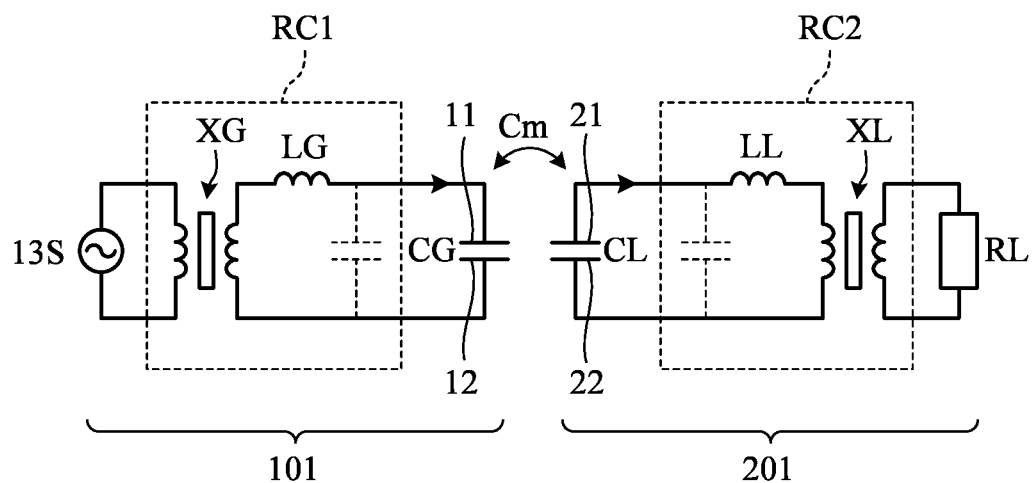
FIG. 1A is a circuit diagram of a power transfer system according to a first embodiment.
Figure 1B:
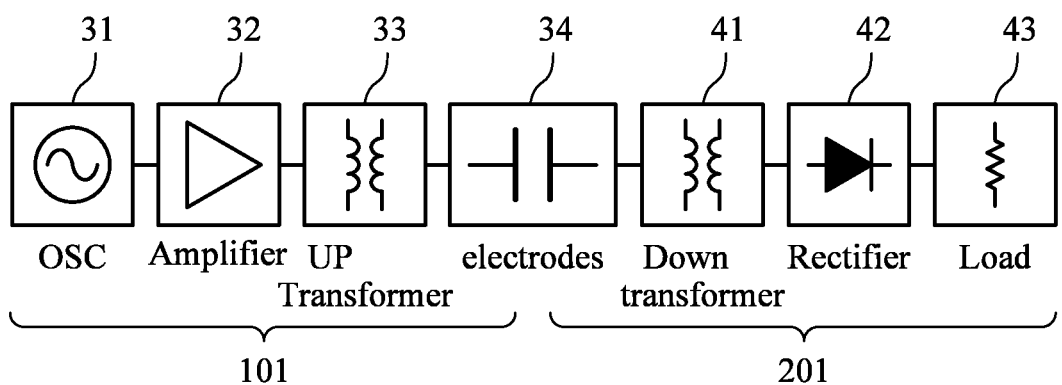
FIG. 1B is a functional block diagram of the power transfer system.

FIG. 1A is a circuit diagram of the power transfer system according to the first embodiment. FIG. 1B is a functional block diagram of the power transfer system. In FIG. 1A, a high-frequency voltage generating circuit 13S in a power transmitting device 101 generates a high-frequency voltage of, for example, 100 kHz to several tens of MHz. A step-up circuit RC1 formed by a step-up transformer XG and an inductor LG steps up the voltage generated by the high-frequency voltage generating circuit 13S and applies the resulting voltage between a passive electrode 12 and an active electrode 11. The high-frequency voltage generating circuit 13S, the step-up transformer XG, and the inductor LG correspond to a "feeding circuit" of the present invention. A capacitor CG is a capacitance mainly formed between the passive electrode 12 and the active electrode 11 in the power transmitting device 101. The inductance and the capacitance of the step-up circuit RC1 form a resonance circuit. Note that the active electrode and the passive electrode, which are referred to as "active electrode" and "passive electrode" for convenience, may be the same in voltage variation (i.e., the capacitance between active electrodes is the same as that between passive electrodes), and this applies to the following description.

In a power receiving device 201, a step-down circuit RC2 formed by a step-down transformer XL and an inductor LL is connected between a passive electrode 22 and an active electrode 21. A capacitor CL is a capacitance mainly formed between the passive electrode 22 and the active electrode 21 in the power receiving device 201. The inductance and the capacitance of the step-down circuit RC2 form a resonance circuit. A load RL is connected to the secondary side of the step-down transformer XL. The load RL is formed by a rectification smoothing circuit composed of a diode and a capacitor, and a secondary battery. A circuit formed by the step-down circuit RC2 and the load RL corresponds to a "load circuit" of the present invention.

Coupled electrodes including the transmitting-device-side passive electrode 12 and active electrode 11 and the receiving-device-side passive electrode 22 and active electrode 21 are capacitively coupled to each other by a mutual capacitance Cm.

As illustrated in FIG. 1B, this power transfer system includes a high-frequency voltage generating unit 31, a power amplifying circuit 32, a step-up transformer 33, coupled electrodes 34, a step-down transformer 41, a rectifying circuit 42, and a load 43. The power amplifying circuit 32 and the step-up transformer 33 form the step-up circuit RC1 illustrated in FIG. 1A. The step-down transformer 41, the rectifying circuit 42, and the load 43 form the load circuit illustrated in FIG. 1A.

Figure 2:
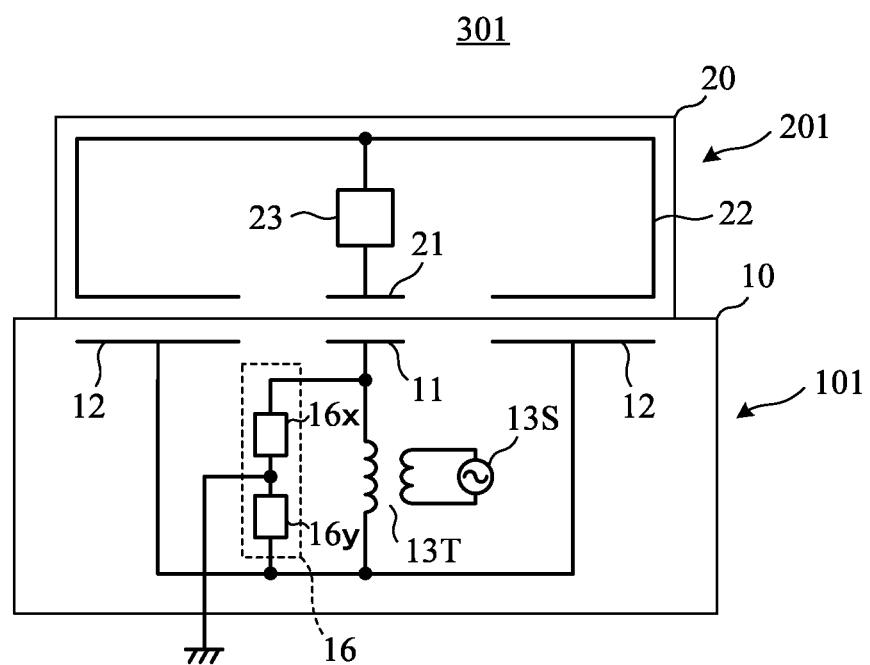
FIG. 2 is a cross-sectional view conceptually illustrating a main part of a power transmitting device and a power receiving device included in a power transfer system according to the first embodiment.

FIG. 2 is a cross-sectional view conceptually illustrating a main part of the power transmitting device and the power receiving device included in a power transfer system 301 according to the first embodiment.

The power transfer system 301 is composed of the power transmitting device 101 and the power receiving device 201. The transmitting-device-side active electrode 11 and the transmitting-device-side passive electrode 12 surrounding and insulated from the electrode 11 are formed near the upper surface of a housing 10 of the power transmitting device 101. The housing 10 of the power transmitting device 101 contains a high-frequency high-voltage generating circuit that applies a high-frequency high voltage between the active electrode 11 and the passive electrode 12. The high-frequency high-voltage generating circuit includes the high-frequency voltage generating circuit 13S and a step-up transformer 13T. A series circuit 16 is connected between the transmitting-device-side active electrode 11 and the transmitting-device-side passive electrode 12. The series circuit 16 is formed by a first element 16x connected to the active electrode 11, and a second element 16y connected to the side of the passive electrode 12. A transmitting-device-side reference potential point, which is a node between the first element 16x and the second element 16y, is connected to a reference potential of the power transmitting device. The first element 16x and the second element 16y include spatially distributed capacitance components and inductance components of wires. Alternatively, the first element 16x and the second element 16y are elements formed by spatially distributed capacitance components and inductance components of wires.

The housing 10 of the power transmitting device 101 is a molded body of plastic, such as ABS resin. The outer surface of the housing 10 is insulated by integrally forming the active electrode 11 and the passive electrode 12 inside the housing 10.

The receiving-device-side active electrode 21 and the receiving-device-side passive electrode 22 surrounding and insulated from the electrode 21 are formed near the lower surface of a housing 20 of the power receiving device 201. The housing 20 of the power receiving device 201 contains a load circuit 23 that receives power induced between the active electrode 21 and the passive electrode 22. In this example, the passive electrode 22 is disposed along the inner periphery of the housing 20. Therefore, the load circuit 23 is covered with the passive electrode 22.

The housing 20 of the power receiving device 201 is also a molded body of plastic, such as ABS resin. The outer surface of the housing 20 is insulated by integrally forming the active electrode 21 and the passive electrode 22 inside the housing 20.

Figure 3:
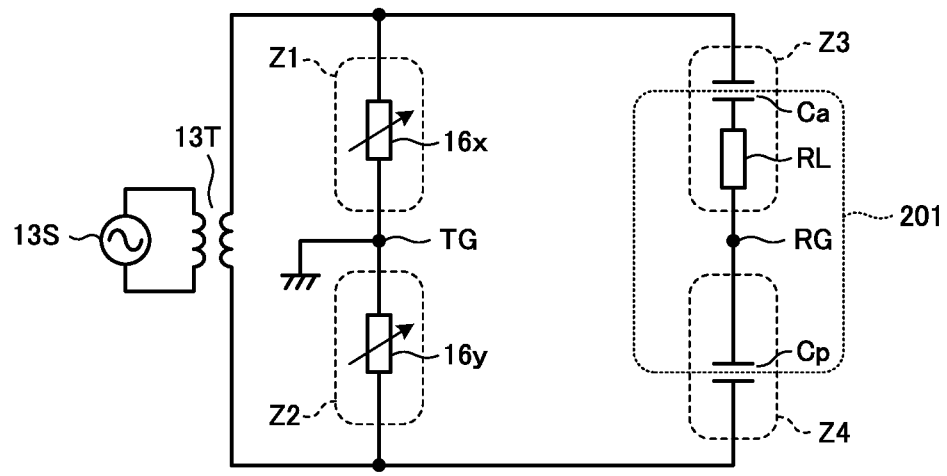
FIG. 3 is an equivalent circuit diagram of the power transfer system.

FIG. 3 is an equivalent circuit diagram of the power transfer system 301. A capacitance Cp is a capacitance formed (equivalently connected) between the transmitting-device-side passive electrode 12 and the receiving-device-side passive electrode 22. A capacitance Ca is a capacitance formed (equivalently connected) between the transmitting-device-side active electrode 11 and the receiving-device-side active electrode 21. In FIG. 3, all circuit parts except the power receiving device 201 are circuits of the power transmitting device. The same parts as those of the circuit illustrated in FIG. 2 are denoted by the same reference signs.

Referring to FIG. 3, a bridge circuit formed by Z1 to Z4 is connected to the secondary side of the step-up transformer 13T, where Z1 represents an impedance of the first element 16x, Z2 represents an impedance of the second element 16y, Z3 represents an impedance of a series circuit formed by the capacitance Ca and the load RL, and Z4 represents an impedance of the capacitance Cp.

Figure 4A:
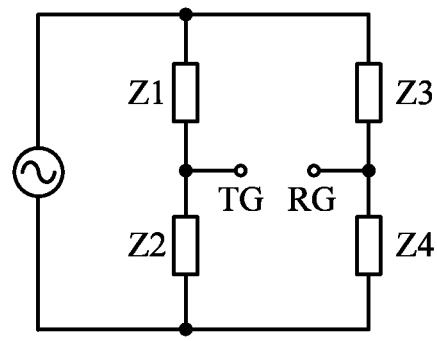
FIG. 4A is an equivalent circuit diagram of a power transfer system obtained by extracting and simplifying a bridge circuit.
Figure 4B:
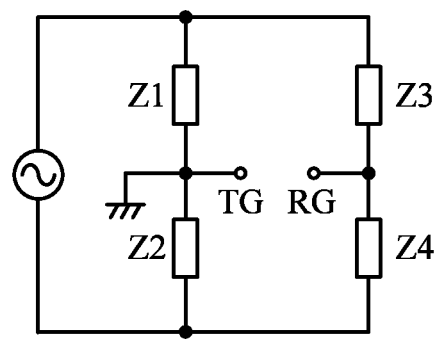
FIG. 4B is an equivalent circuit diagram of a power transfer system obtained by extracting and simplifying a bridge circuit.

FIGS. 4A and 4B are each an equivalent circuit diagram of a power transfer system obtained by extracting and simplifying the bridge circuit. A node between the impedance Z1 and the impedance Z2 is a transmitting-device-side reference potential point TG, and a node between the impedance Z3 and the impedance Z4 is a receiving-device-side reference potential point RG. A balance condition of the bridge circuit can be expressed as follows:

$$Z1 \times Z4 = Z2 \times Z3$$

where the reference signs Z1 to Z4 represent impedances of the impedances Z1 to Z4 described above. When this balance condition is satisfied, a potential difference between the transmitting-device-side reference potential point TG and the receiving-device-side reference potential point RG is 0.

Therefore, as illustrated in FIG. 4B, when the transmitting-device-side reference potential point TG is connected to the ground potential of the power transmitting device, the potential of the receiving-device-side reference potential point RG is equal to the ground potential of the power transmitting device. Since the receiving-device-side reference potential point RG is the receiving-device-side passive electrode (one end of the capacitance Cp) as illustrated in FIG. 3, the housing 20 of the power receiving device 201 illustrated in FIG. 2 is equal to the ground potential of the power transmitting device 101. Typically, the ground potential of the power transmitting device 101 is an earth potential. Therefore, by setting the impedances Z1 to Z4 such that the balance condition described above is satisfied, the reference potential on the receiving device side can be brought closer to the ground potential (earth potential). This can prevent malfunction of, for example, an electrostatic input device (capacitive touch panel) that a person uses for input by touching it.

Second Embodiment

Figure 5:
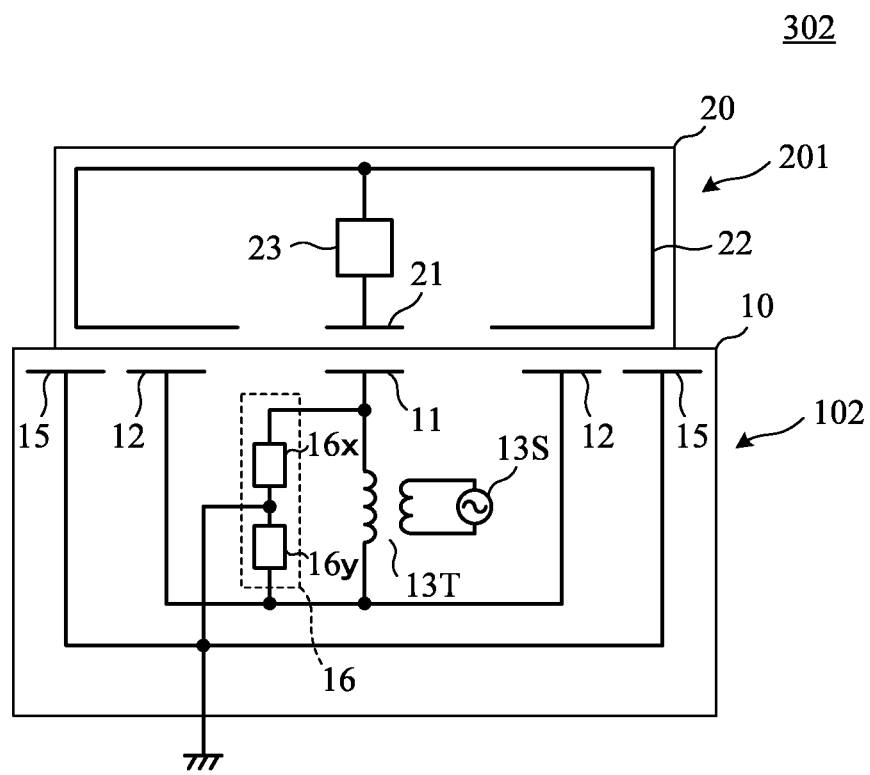
FIG. 5 is a cross-sectional view conceptually illustrating a main part of a power transmitting device and a power receiving device included in a power transfer system according to a second embodiment.

FIG. 5 is a cross-sectional view conceptually illustrating a main part of a power transmitting device 102 and a power receiving device 201 included in a power transfer system 302 according to a second embodiment.

The power transfer system 302 is composed of the power transmitting device 102 and the power receiving device 201. The transmitting-device-side active electrode 11, the transmitting-device-side passive electrode 12 surrounding and insulated from the electrode 11, and a guard electrode 15 surrounding and insulated from the electrode 12 are formed near the upper surface of the housing 10 of the power transmitting device 102. The housing 10 of the power transmitting device 102 contains the high-frequency voltage generating circuit 13S and the step-up transformer 13T between the active electrode 11 and the passive electrode 12. The series circuit 16 is connected between the transmitting-device-side active electrode 11 and the transmitting-device-side passive electrode 12. The series circuit 16 is formed by the first element 16x connected to the active electrode 11, and the second element 16y connected to the side of the passive electrode 12. The transmitting-device-side reference potential point, which is a node between the first element 16x and the second element 16y, is connected to a reference potential of the power transmitting device. The guard electrode 15 is connected to the reference potential of the power transmitting device.

The configuration of the power receiving device 201 is the same as that of the power receiving device 201 described in the first embodiment. The receiving-device-side passive electrode 22 faces not only the transmitting-device-side passive electrode 12 but also the guard electrode 15.

Figure 6:
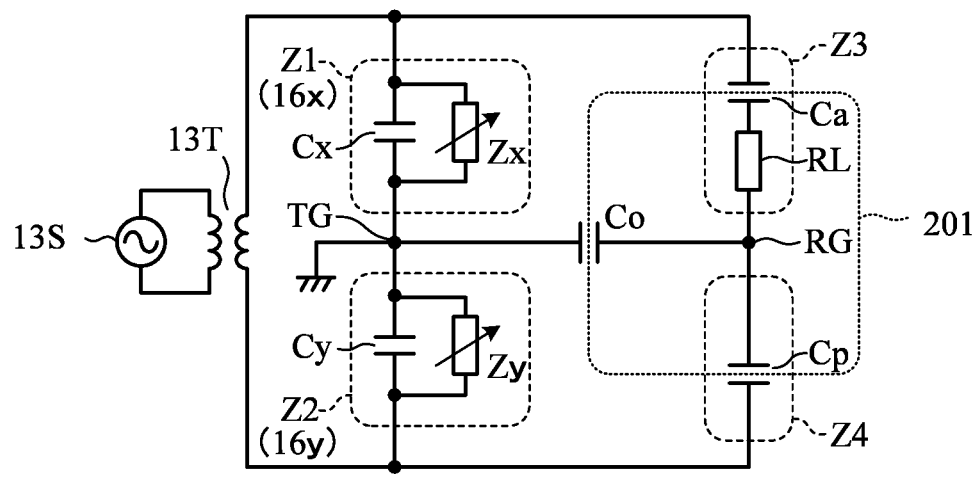
FIG. 6 is an equivalent circuit diagram of the power transfer system.

FIG. 6 is an equivalent circuit diagram of the power transfer system 302. The capacitance Cp is a capacitance formed (equivalently connected) between the transmitting-device-side passive electrode 12 and the receiving-deviceside passive electrode 22. The capacitance Ca is a capacitance formed (equivalently connected) between the transmitting-device-side active electrode 11 and the receiving-device-side active electrode 21. A capacitor Co is a capacitance formed (equivalently connected) between the guard electrode 15 and the receiving-device-side passive electrode 22.

The first element 16x is a parallel connection circuit formed by a capacitor Cx and a variable impedance element Zx. Similarly, the second element 16y is a parallel connection circuit formed by a capacitor Cy and a variable impedance element Zy.

In FIG. 6, all circuit parts except the power receiving device 201 are circuits of the power transmitting device 102. The same parts as those of the circuit illustrated in FIG. 2 are denoted by the same reference signs.

Referring to FIG. 6, a bridge circuit formed by Z1 to Z4 is connected to the secondary side of the step-up transformer 13T, where Z1 represents an impedance of the first element 16x, Z2 represents an impedance of the second element 16y, Z3 represents an impedance of a series circuit formed by the capacitance Ca and the load RL, and Z4 represents an impedance of the capacitance Cp. A balance condition of this bridge circuit can be expressed as Z1×Z4=Z2×Z3. When this balance condition is satisfied, a potential difference between the transmitting-device-side reference potential point TG and the receiving-device-side reference potential point RG is 0. Even if there is a slight deviation from the balance condition, since the capacitor Co is equivalently connected between the transmitting-device-side reference potential point TG and the receiving-device-side reference potential point RG, an impedance between the transmitting-device-side reference potential point TG and the receiving-device-side reference potential point RG is low. Therefore, a potential difference between the transmitting-device-side reference potential point TG and the receiving-device-side reference potential point RG is lower than that in the case where the capacitor Co is not present. Hence, it is possible to reduce a difference between the receiving-device-side reference potential point and the ground potential (earth potential).

If there is a deviation from the balance condition due to variation in the coupling capacitances Ca and Cp or variation in the load RL, the balance condition can be maintained by appropriately adjusting the variable impedances elements Zx and Zy. By maintaining the balance condition, a potential difference between the reference potential points TG-RG can be kept small. If there is no significant variation in the coupling capacitances Ca and Cp or in the load RL, the variable impedances elements Zx and Zy may be fixed.

That is, the second embodiment can improve tolerance for deviation from the balance condition.

The adjustment of the variable impedances elements Zx and Zy may be always actively controlled by feedback. When the control is performed on the receiving device side, for example, a deviation from the balance condition is detected by measuring the potential of the reference potential point RG in the power receiving device 201, and the variable impedance elements Zx and Zy are feedback-controlled such that the potential of the reference potential point RG is a predetermined potential. When the control is performed on the transmitting device side, a common mode current flowing from the ground potential into the reference potential point TG on the transmitting device side is measured, and the variable impedance elements Zx and Zy are feedback-controlled such that the common mode current is 0. Only one of the variable impedance elements Zx and Zy may be made variable and feedback-controlled.

Third Embodiment

Figure 7:
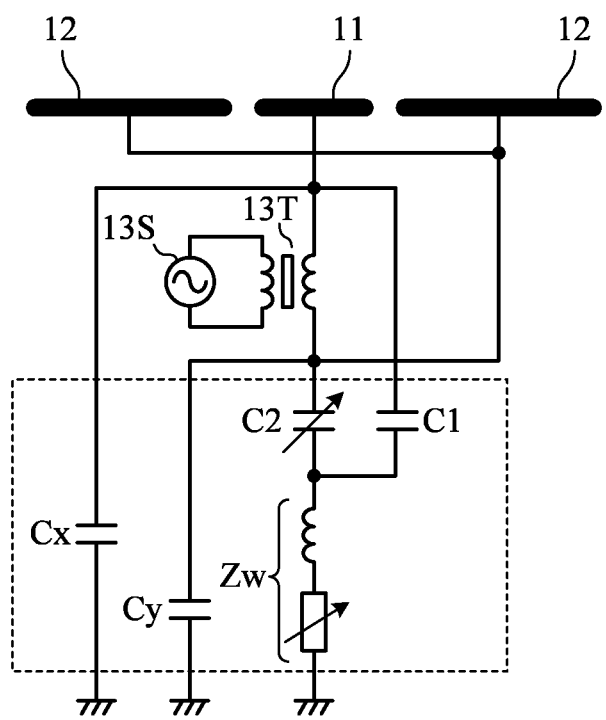
FIG. 7 is a circuit diagram of a power transmitting device included in a power transfer system according to a third embodiment.

FIG. 7 is a circuit diagram of a power transmitting device 103 included in a power transfer system according to a third embodiment. The transmitting-device-side active electrode 11 and the transmitting-device-side passive electrode 12 surrounding and insulated from the electrode 11 are formed near the upper surface of a housing of the power transmitting device 103. The housing of the power transmitting device 103 contains a high-frequency high-voltage generating circuit that applies a high-frequency high voltage between the active electrode 11 and the passive electrode 12. The high-frequency high-voltage generating circuit includes the high-frequency voltage generating circuit 13S and the step-up transformer 13T. A series circuit formed by a capacitor C1 and a variable capacitor C2 is connected between the transmitting-device-side active electrode 11 and the transmitting-device-side passive electrode 12. A variable impedance circuit Zw is connected between a node between the capacitor C1 and the variable capacitor C2 and the ground. The capacitor Cx is connected between the active electrode 11 and the ground. The capacitor Cy is connected between the passive electrode 12 and the ground.

Figure 8A:
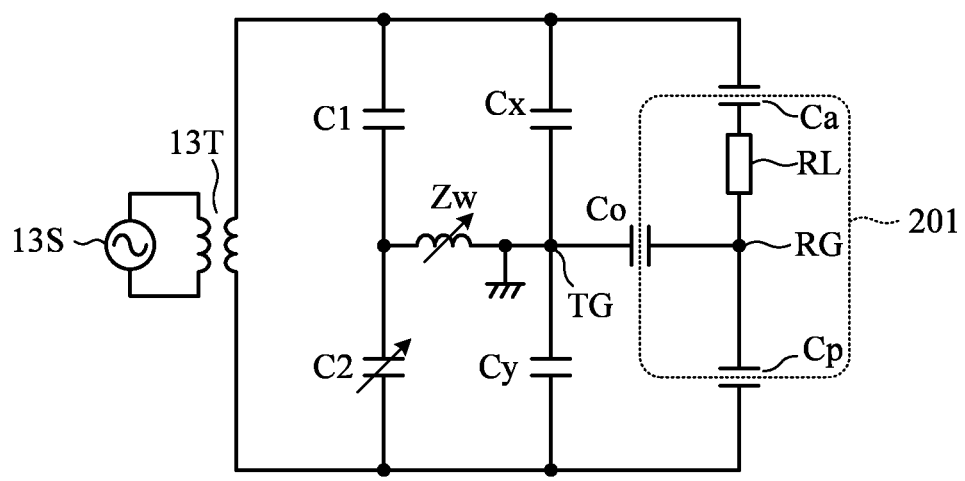
FIG. 8A is an equivalent circuit diagram of the power transfer system according to the third embodiment.
Figure 8B:
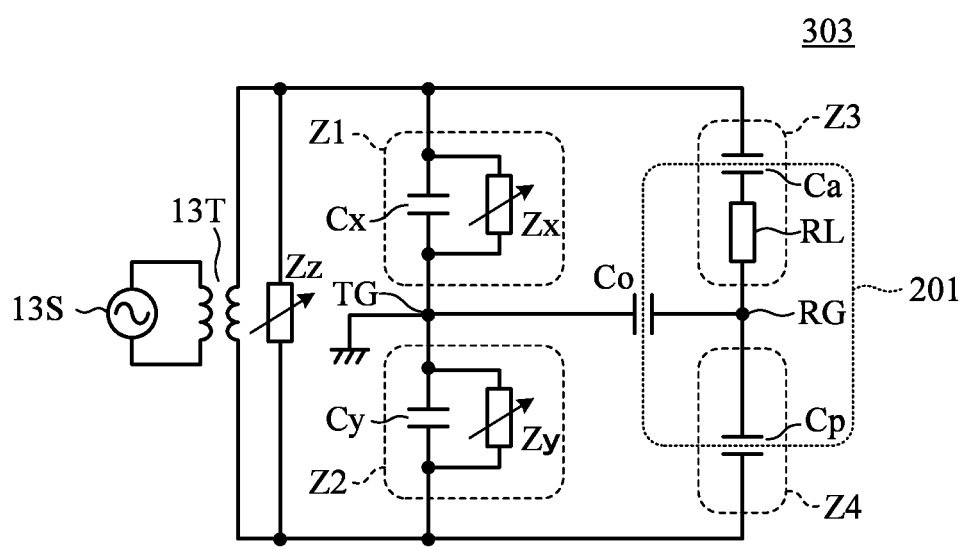
FIG. 8B is an equivalent circuit diagram of the power transfer system according to the third embodiment.

FIGS. 8A and 8B are each an equivalent circuit diagram of the power transfer system according to the third embodiment. In FIGS. 7 and 8A, the same elements are denoted by the same reference signs. The configuration of the power receiving device 201 in the power transfer system 303 is the same as that described in the first and second embodiments. In FIG. 8A, the variable impedance circuit Zw is represented by a variable inductor symbol.

FIG. 8B is an equivalent circuit diagram obtained by converting a Y (star) circuit formed by the capacitor C1, the variable capacitor C2, and the variable impedance circuit Zw in the equivalent circuit of FIG. 8A into a Δ (delta) circuit. That is, the Y circuit is equivalent to the Δ circuit formed by the variable impedance elements Zx, Zy, and Zz. The capacitor Cx and the variable impedance element Zx form the impedance circuit Zw, which is one side of a bridge circuit, and the capacitor Cy and the variable impedance element Zy form the impedance Z2, which is another side of the bridge circuit.

Thus, the impedances of two sides of the bridge circuit can be formed by variable impedance circuits. That is, with the variable impedance circuit Zw and the variable capacitor C2 illustrated in FIG. 8A, an adjustment can be made such that the balance condition of the bridge circuit is satisfied. Specifically, the variable impedance circuit Zw can adjust a real part of the balance condition, and the variable capacitor C2 can adjust an imaginary part of the balance condition. Therefore, the amplitude of the voltage of the receiving-device-side reference potential point RG can be reduced in both the real and imaginary parts in a balanced way.

Figure 9:
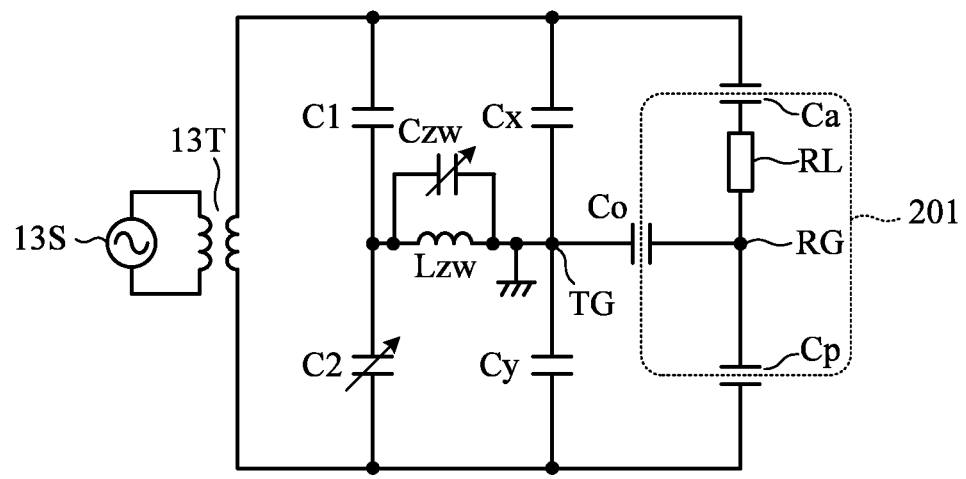
FIG. 9 is an equivalent circuit diagram of a modification of the power transfer system according to the third embodiment illustrated in FIGS. 8A and 8B.

FIG. 9 is an equivalent circuit diagram of a modification of the power transfer system according to the third embodiment illustrated in FIG. 8A. In a power transfer system 303A illustrated in FIG. 9, the variable impedance circuit Zw illustrated in FIG. 7 is composed of an inductor Lzw and a variable capacitor Czw connected in parallel. In the power transfer system 303A, a resonance frequency of this LC parallel circuit is set to be higher than the frequency of a high-frequency voltage generated by the high-frequency voltage generating circuit 13S. That is, the LC parallel circuit is used in an inductive region, and a capacitance value of the variable capacitor Czw is varied to satisfy the balance condition. It is thus possible to stabilize the receiving-side reference potential.

Fourth Embodiment

Figure 10:
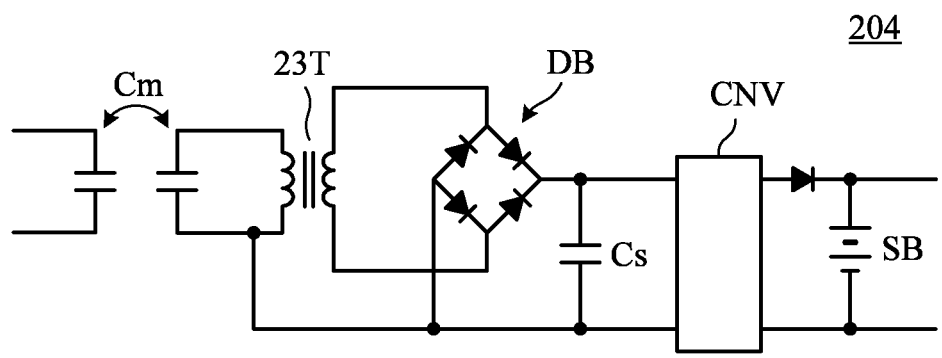
FIG. 10 is a circuit diagram of a power receiving device included in a power transfer system according to a fourth embodiment.

FIG. 10 is a circuit diagram of a power receiving device 204 included in a power transfer system according to a fourth embodiment. In this example, a rectification smoothing circuit composed of a diode bridge circuit DB and a capacitor Cs is formed on the secondary side of the step-down transformer 23T. A DC-DC converter CNV is connected to an output part of the rectification smoothing circuit, so that a secondary battery SB is charged by the output of this converter.

Figure 11:
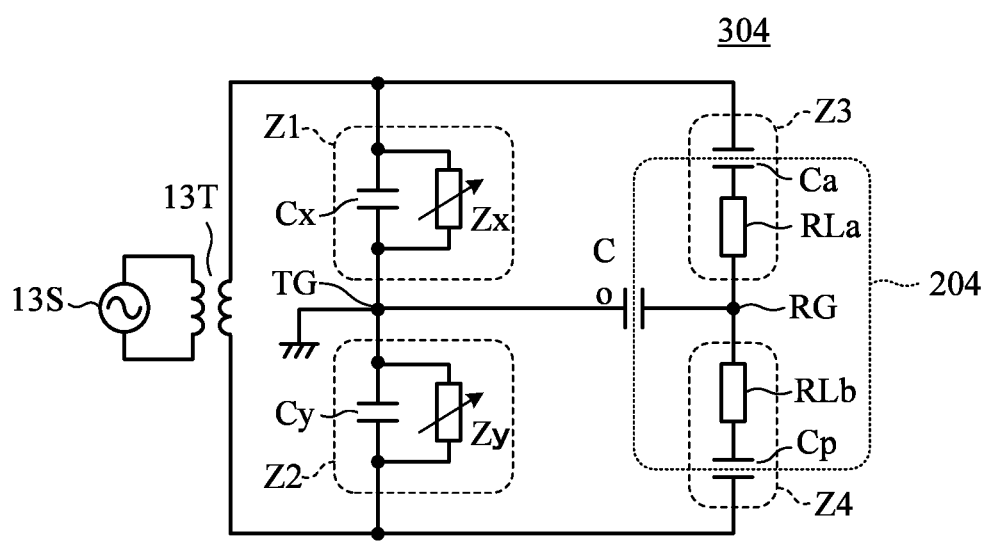
FIG. 11 is an equivalent circuit diagram of a power transfer system including the power receiving device illustrated in FIG. 10.

FIG. 11 is an equivalent circuit diagram of a power transfer system 304 including the power receiving device 204 illustrated in FIG. 10. When a rectifying circuit is formed by a diode bridge as illustrated in FIG. 10, the reference potential of the power receiving device is equivalently equal to the midpoint potential of the secondary coil of the step-down transformer. Therefore, as illustrated in FIG. 11, a node between loads RLa and RLb serves as the receiving-device-side reference potential point RG. That is, an impedance of a circuit extending from the receiving-device-side reference potential point RG to the receiving-device-side passive electrode (one end of the capacitance Cp) is equal to an impedance of a circuit extending from the receiving-device-side reference potential point RG to the receiving-device-side active electrode (one end of the capacitance Ca), and a balanced circuit is obtained.

The configuration of the power transmitting device is the same as that described in the second embodiment. Even with this circuit configuration, the impedances of Zx and Zy may be adjusted to satisfy the balance condition $Z1 \times Z4 = Z2 \times Z3$.

Fifth Embodiment

Figure 12:
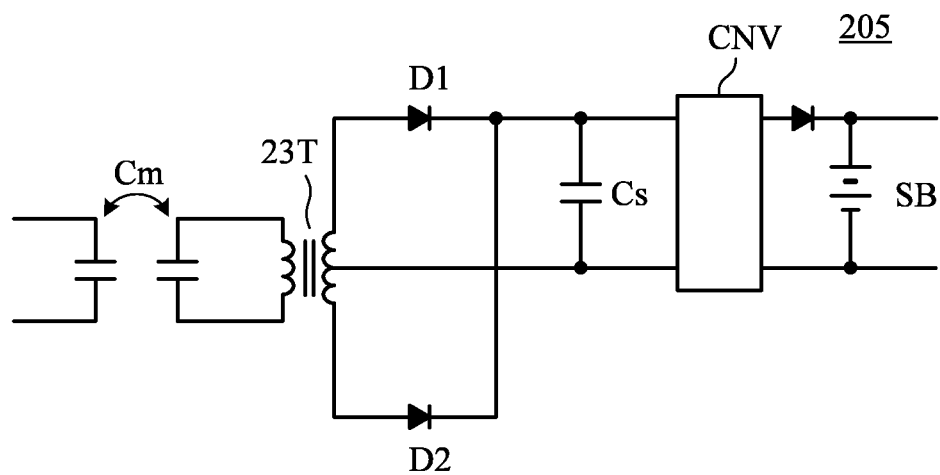
FIG. 12 is a circuit diagram of a power receiving device included in a power transfer system according to a fifth embodiment.

FIG. 12 is a circuit diagram of a power receiving device 205 included in a power transfer system according to a fifth embodiment. In this example, a center tap on the secondary side of the step-down transformer 23T is at a reference potential, and a center-tap rectifying circuit is formed by connecting diodes D1 and D2 at both ends of the secondary side. The DC-DC converter CNV is connected to an output part of the rectification smoothing circuit, so that the secondary battery SB is charged by the output of this converter.

Figure 13:
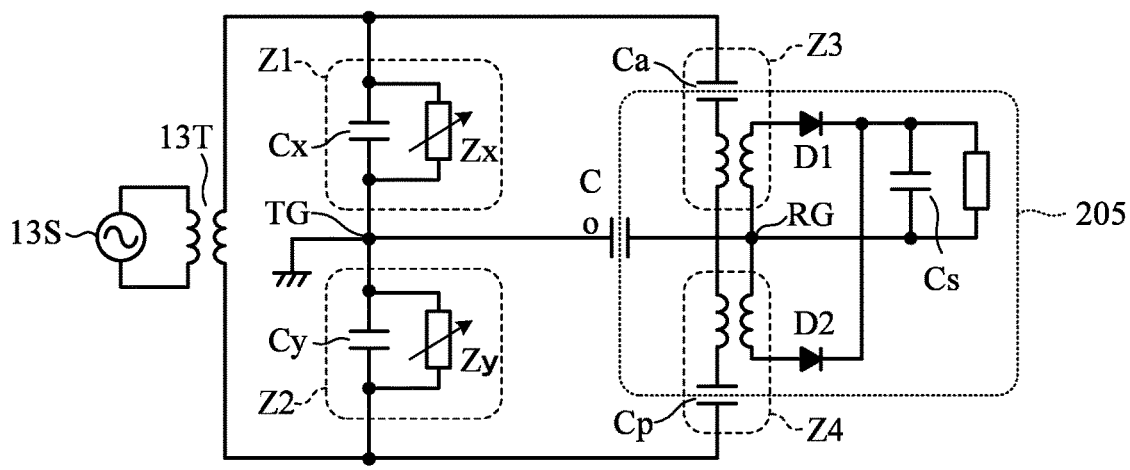
FIG. 13 is an equivalent circuit diagram of a power transfer system including the power receiving device illustrated in FIG. 12.

FIG. 13 is an equivalent circuit diagram of a power transfer system 305 including the power receiving device 205 illustrated in FIG. 12. When the center-tap rectifying circuit is configured as illustrated in FIG. 12, the reference potential of the power receiving device is equivalently equal to the midpoint potential of the secondary coil of the step-down transformer. The equivalent circuit illustrated in FIG. 13 is thus obtained.

The configuration of the power transmitting device is the same as that described in the second embodiment. Even with this circuit configuration, the impedances of Zx and Zy may be adjusted to satisfy the balance condition $Z1 \times Z4 = Z2 \times Z3$.

Sixth Embodiment

Figure 14:
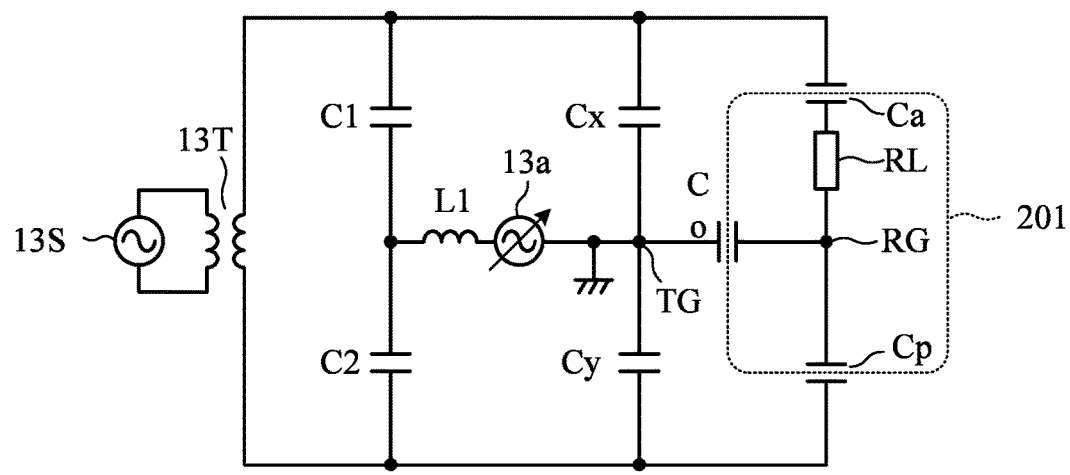
FIG. 14 is an equivalent circuit diagram of a power transfer system according to a sixth embodiment.

FIG. 14 is an equivalent circuit diagram of a power transfer system 306 according to a sixth embodiment. Unlike the equivalent circuit illustrated in FIG. 8A in the third embodiment, the power transfer system 306 includes an adjustment alternating-current source 13a. A series circuit formed by the adjustment alternating-current source 13a and an inductor L1 is connected to the reference potential (ground potential) at one end, and connected to a node between the capacitors C1 and C2 at the other end. The adjustment alternating-current source 13a and the inductor L1 serve as a current source.

In the circuit illustrated in FIG. 14, a voltage dividing circuit formed by the capacitors C1 and C2 divides a voltage into voltages in the vicinity of a neutral point, and the adjustment alternating-current source 13a injects a cancellation signal into a resulting potential in the vicinity of the neutral point. The power transfer system 306 of the sixth embodiment is obtained by replacing the variable impedance circuit Zw and the variable capacitor C2 of the circuit illustrated in FIG. 8A in the third embodiment with the current source that injects a cancellation signal. That is, by adjusting the amplitude and phase of the adjustment alternating-current source 13a, the setting can be made such that the balance condition is satisfied. Thus, even if there is a deviation from the balance condition $Z1 \times Z4 = Z2 \times Z3$, a noise component caused by the deviation can be easily cancelled. Also, the cancellation of the noise component can be actively controlled in accordance with changes in the degree of coupling between the transmitting device and the receiving device, load variation, and the like.

A switching circuit synchronized with a driving source (alternating voltage signal) may be used as the adjustment alternating-current source 13a.

According to the sixth embodiment, without using a passive variable impedance element, the active circuit can perform control such that the balance condition is satisfied.

Figure 15A:
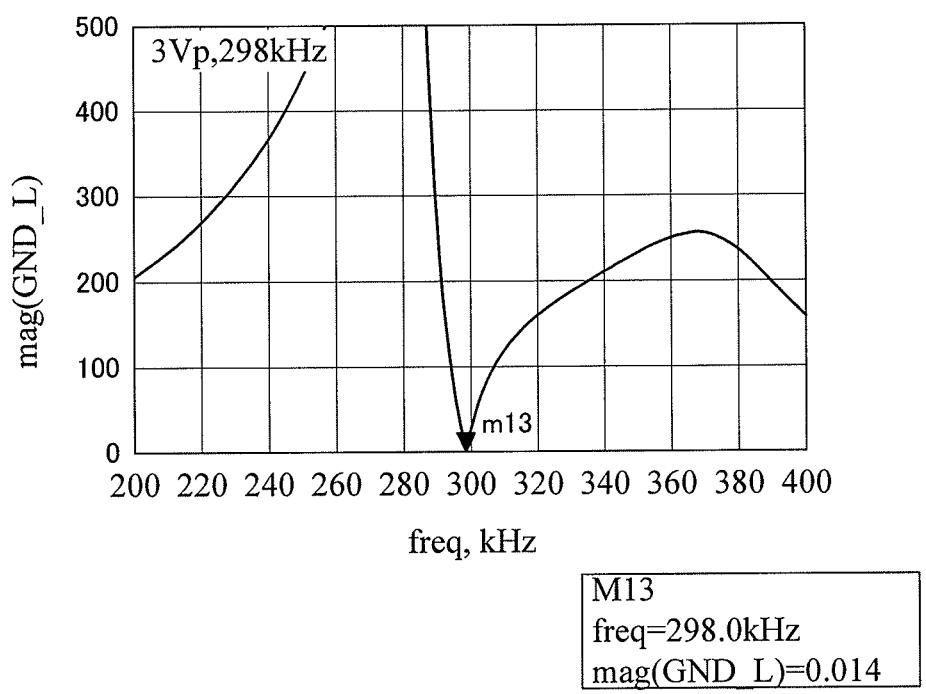
FIG. 15A is a diagram showing a frequency characteristic of a potential of a receiving-device-side passive electrode of the power transfer system.

FIG. 15A is a diagram showing a frequency characteristic of a potential of a receiving-device-side passive electrode of the power transfer system 306. FIG. 15B is a diagram showing a frequency characteristic of a potential of the receiving-device-side passive electrode of a power transfer system not having the adjustment alternating-current source 13a illustrated in FIG. 14.

Figure 16A:
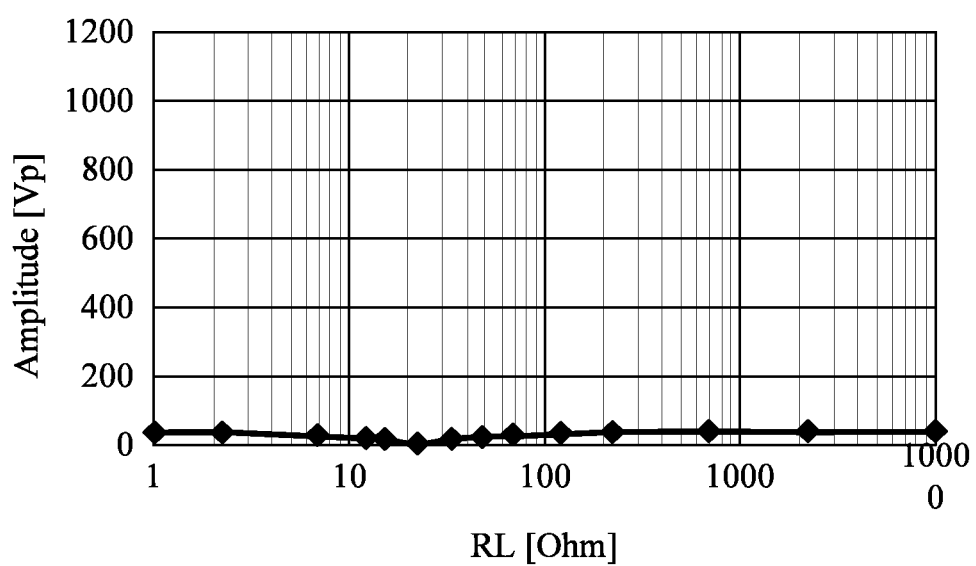
FIG. 16A shows the amount of amplitude corrected by the adjustment alternating-current source.
Figure 16B:
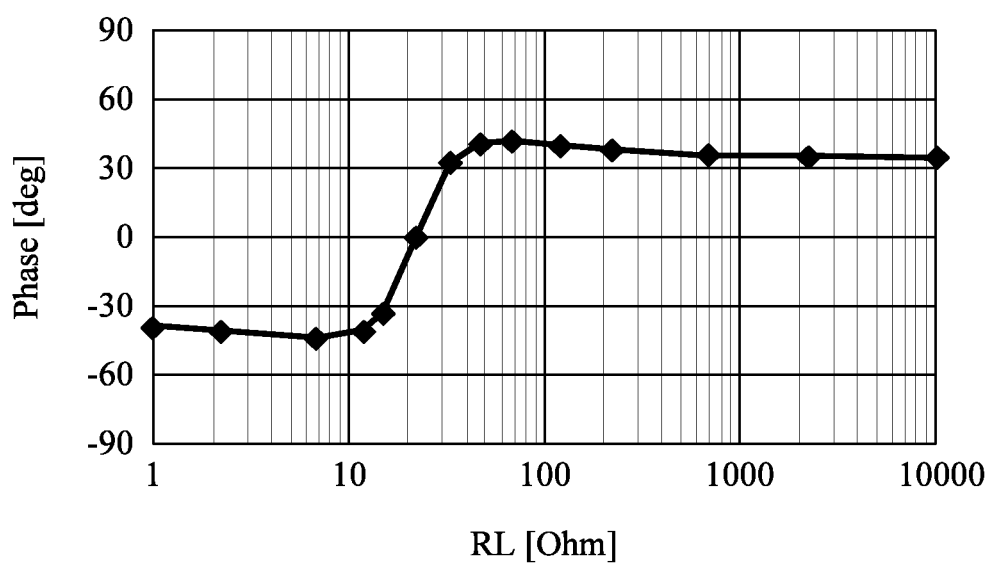
FIG. 16B shows the amount of phase corrected by the adjustment alternating-current source.

FIG. 16A shows the amount of amplitude corrected by the adjustment alternating-current source 13a. FIG. 16B shows the amount of phase corrected by the adjustment alternating-current source 13a. In both drawings, the horizontal axis represents the impedance of the load RL. The amplitude and phase of alternating current injected into the circuit by the adjustment alternating-current source 13a are determined by feedback. For example, a common mode current flowing from the ground potential into the reference potential point TG on the transmitting device side is measured, and the adjustment alternating-current source 13a adjusts the amplitude and phase of alternating current injected into the circuit such that the common mode current is 0.

As is obvious from FIG. 15A, the potential variation can be minimized at a specific frequency (298 kHz in this example). When the adjustment alternating-current source 13a is not provided, as is obvious from FIG. 15B, no minimum point of potential variation appears at any specific frequency. Without the adjustment alternating-current source 13a, the potential of the passive electrode at 298 kHz is 282 Vp. When the adjustment alternating-current source 13a is provided and the balance condition is satisfied, the potential of the passive electrode can be reduced to as low as only about 3 Vp.

Seventh Embodiment

Figure 17:
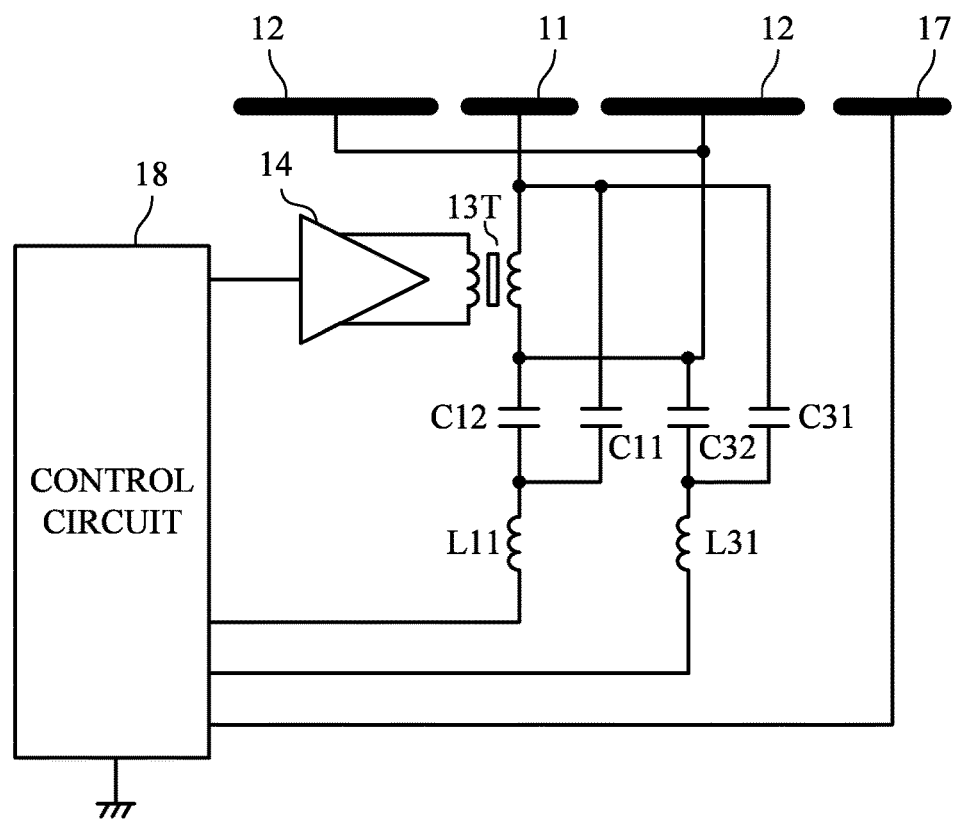
FIG. 17 is a circuit diagram of a power transmitting device included in a power transfer system according to a seventh embodiment.

FIG. 17 is a circuit diagram of a power transmitting device 107 included in a power transfer system according to a seventh embodiment. The transmitting-device-side active electrode 11, the transmitting-device-side passive electrode 12 surrounding and insulated from the electrode 11, and an auxiliary electrode 17 are formed near the upper surface of a housing of the power transmitting device 107. The transmitting-device-side active electrode 11 faces the receiving-device-side active electrode, and the transmitting-device-side passive electrode 12 faces the receiving-device-side passive electrode. The auxiliary electrode 17 also faces the receiving-device-side passive electrode.

The secondary side of the step-up transformer 13T is connected between the active electrode 11 and the passive electrode 12, and a power amplifying circuit 14 is connected to the primary side of the step-up transformer 13T. A series circuit formed by capacitors C11 and C12 and a series circuit formed by capacitors C31 and C32 are connected between the transmitting-device-side active electrode 11 and the transmitting-device-side passive electrode 12. An inductor L11 is connected to a node between the capacitors C11 and C12. Similarly, an inductor L31 is connected to a node between the capacitors C31 and C32.

The power transmitting device 107 further includes a control circuit 18. The control circuit 18 outputs a high-frequency voltage to the power amplifying circuit 14, detects a signal induced in the auxiliary electrode 17, and injects a cancellation signal into the inductors L11 and L31. Specifically, the control circuit 18 detects the amplitude and phase for a fundamental frequency component of a voltage induced in the auxiliary electrode 17, and injects a cancellation signal into the inductor L11 such that for the fundamental frequency component, the voltage induced in the auxiliary electrode 17 is close to 0. Similarly, for a third harmonic component, a cancellation signal is injected into the inductor L31 such that a voltage induced in the auxiliary electrode 17 is close to 0.

The equivalent circuit of the power transfer system including the power transmitting device illustrated in FIG. 17 is equal to a circuit obtained by adding a cancellation circuit for a third harmonic component to the circuit illustrated in FIG. 14.

Thus, by adjusting the amplitude and phase of an injected cancellation signal such that the balance condition is satisfied for not only a fundamental frequency component but for a harmonic component, the voltage can be reduced for the fundamental and harmonic (particularly a third harmonic having a higher ratio) of the receiving-device-side passive electrode.

Eighth Embodiment

Figure 18:
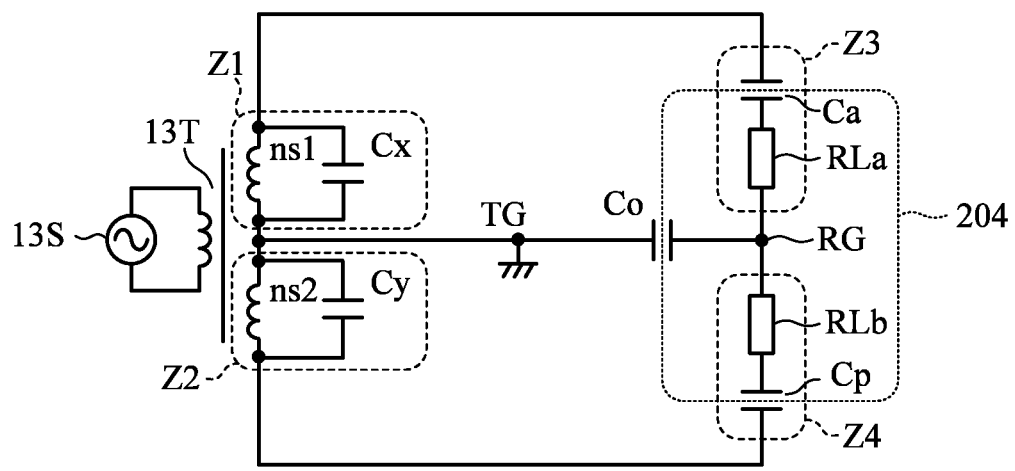
FIG. 18 is an equivalent circuit diagram of a power transfer system according to an eighth embodiment.

FIG. 18 is an equivalent circuit diagram of a power transfer system 308 according to an eighth embodiment.

The power transfer system 308 illustrated in FIG. 18 does not include the variable impedance elements Zx and Zy in the equivalent circuit illustrated in FIG. 6 in the second embodiment. In the power transfer system 308, the secondary coil of the step-up transformer 13T has a lead terminal. The secondary coil is divided by the lead terminal into a first secondary coil ns1 and a second secondary coil ns2. Specifically, the first secondary coil ns1 is formed between the transmitting-device-side active electrode and the lead terminal, and the second secondary coil ns2 is formed between the transmitting-device-side passive electrode and the lead terminal.

The capacitor Cx is connected in parallel with the first secondary coil ns1 to form the impedance Z1. This impedance Z1 corresponds to a first element of the present invention. The capacitor Cy is connected in parallel with the second secondary coil ns2 to form the impedance Z2. This impedance Z2 corresponds to a second element of the present invention.

The configuration of the power receiving device 204 is the same as that illustrated in FIG. 11 in the fourth embodiment. In the power transfer system 308, by varying the impedances of the first secondary coil ns1 and the second secondary coil ns2 in accordance with the number of turns of the secondary coil of the step-up transformer 13T or the position of the lead terminal, an adjustment can be made such that the balance condition Z1×Z4=Z2×Z3 is satisfied. It is thus possible to stabilize the receiving-side reference potential while reducing the number of necessary elements.

Ninth Embodiment

Figure 19:
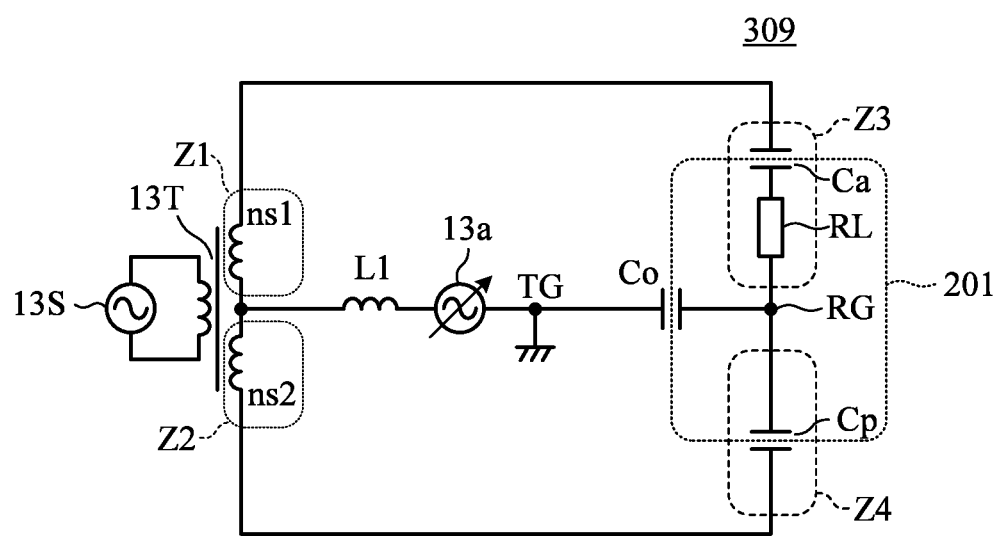
FIG. 19 is an equivalent circuit diagram of a power transfer system according to a ninth embodiment.

FIG. 19 is an equivalent circuit diagram of a power transfer system 309 according to a ninth embodiment.

Unlike the equivalent circuit illustrated in FIG. 14 in the sixth embodiment, the power transfer system 309 illustrated in FIG. 19 does not include the capacitors C1 and C2. Like the equivalent circuit illustrated in FIG. 18 in the eighth embodiment, the secondary coil of the step-up transformer 13T has a lead terminal, and is divided by the lead terminal into the first secondary coil ns1 and the second secondary coil ns2. The first secondary coil ns1 and a parasitic capacitance form the impedance Z1. This Z1 corresponds to the first element of the present invention. The second secondary coil ns2 and a parasitic capacitance form the impedance Z2. This impedance Z2 corresponds to the second element of the present invention.

A series circuit formed by the adjustment alternating-current source 13a and the inductor L1 is connected to the lead terminal of the secondary coil. This series circuit is the same as that illustrated in FIG. 14 in the sixth embodiment, and the adjustment alternating-current source 13a and the inductor L1 serve as an alternating current source. The configuration of the power receiving device 201 is the same as that of the power receiving device 201 described in the first embodiment.

With this circuit configuration, it is possible to stabilize the receiving-side reference potential while reducing the number of necessary elements. Even if there is a deviation from the balance condition Z1×Z4=Z2×Z3, the setting can be made to satisfy the balance condition by adjusting the amplitude and phase of the adjustment alternating-current source 13a and injecting a cancellation signal. Thus, even if there is a deviation from the balance condition Z1×Z4=Z2×Z3, a noise component caused by the deviation can be easily cancelled. Also, the cancellation of the noise component can be actively controlled in accordance with changes in the degree of coupling between the transmitting device and the receiving device, load variation, and the like.

Tenth Embodiment

Figure 20:
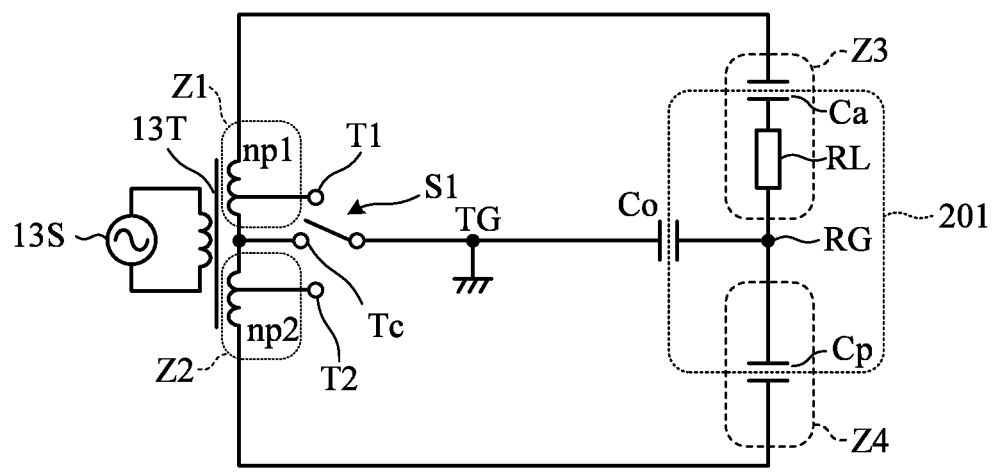
FIG. 20 is an equivalent circuit diagram of a power transfer system according to a tenth embodiment.

FIG. 20 is an equivalent circuit diagram of a power transfer system 310 according to a tenth embodiment.

Unlike the equivalent circuit illustrated in FIG. 19 in the ninth embodiment, the power transfer system 310 illustrated in FIG. 20 does not include the series circuit formed by the adjustment alternating-current source 13a and the inductor L1. The secondary coil of the step-up transformer 13T has a center tap Tc, and the first secondary coil ns1 and the second secondary coil ns2 are formed. The first secondary coil ns1 has a lead terminal T1, and the second secondary coil ns2 has a lead terminal T2.

An adjustment switching circuit S1 is connected between the secondary coil of the step-up transformer 13T and the reference potential point TG. The adjustment switching circuit S1 connects the center tap Tc and one of the lead terminals T1 and T2 to the reference potential point TG. The adjustment switching circuit S1 is controlled, for example, by a microcomputer (not shown).

In the power transfer system 310 described above, switching of the adjustment switching circuit S1 allows selection of a connection destination of the reference potential point TG, so that the impedances of the impedance Z1 and Z2 can be changed. Thus, with a simple and low-cost circuit configuration, the setting can be made to satisfy the balance condition $Z1 \times Z4 = Z2 \times Z3$. It is not necessary that the center tap Tc be positioned in the center of the secondary coil. It is only necessary that setting be appropriately made such that voltages obtained by dividing the voltage between both ends of the secondary coil by the impedance of the first secondary coil ns1 and the impedance of the second secondary coil ns2 are in the vicinity of the reference potential voltage.

Eleventh Embodiment

Figure 21:
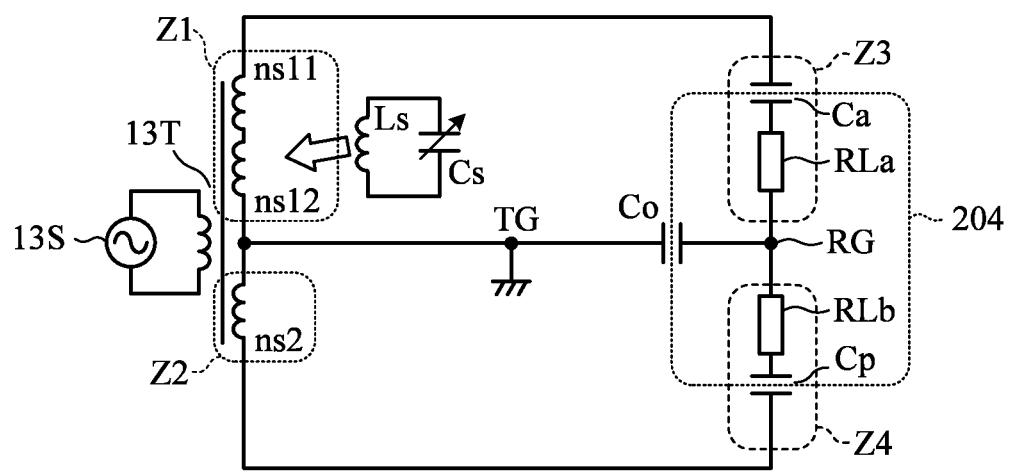
FIG. 21 is an equivalent circuit diagram of a power transfer system according to an eleventh embodiment.

FIG. 21 is an equivalent circuit diagram of a power transfer system 311 according to an eleventh embodiment.

Unlike the equivalent circuit illustrated in FIG. 19 in the ninth embodiment, the power transfer system 311 illustrated in FIG. 21 does not include the series circuit formed by the adjustment alternating-current source 13a and the inductor L1. The secondary coil of the step-up transformer 13T has a lead terminal connected to the reference potential point TG. The secondary coil of the step-up transformer 13T is divided by the lead terminal into first secondary coils ns11 and ns12 and the second secondary coil ns2.

The first secondary coils ns11 and ns12 and a parasitic capacitance form the impedance Z1. This impedance Z1 corresponds to the first element of the present invention. The second secondary coil ns2 and a parasitic capacitance form the impedance Z2. This impedance Z2 corresponds to the second element of the present invention. The configuration of the power receiving device 204 is the same as that illustrated in FIG. 11 in the fourth embodiment.

The power transfer system 311 includes an LC parallel circuit formed by an inductor Ls and the variable capacitor Cs. In the power transfer system 311, a resonance frequency of the LC parallel circuit is set to be higher than a frequency of the high-frequency voltage generated by the high-frequency voltage generating circuit 13S. That is, the LC parallel circuit is used in an inductive region to adjust the impedance of the impedance Z1. Specifically, by coupling the inductor Ls to the first secondary coil ns12, the impedance of the impedance Z1 is adjusted to satisfy the balance condition $Z1 \times Z4 = Z2 \times Z3$. Thus, the receiving-device-side reference potential can be stabilized.

The capacitance of the variable capacitor Cs is adjusted, for example, by a microcomputer (not shown) that detects the receiving-device-side reference potential at RG. More specifically, the microcomputer detects the amplitude and phase for a fundamental frequency component of a voltage induced in the auxiliary electrode 17 illustrated in FIG. 17, and adjusts the capacitance of the variable capacitor Cs such that for the fundamental frequency component, the voltage induced in the auxiliary electrode 17 is close to 0.

Twelfth Embodiment

Figure 22:
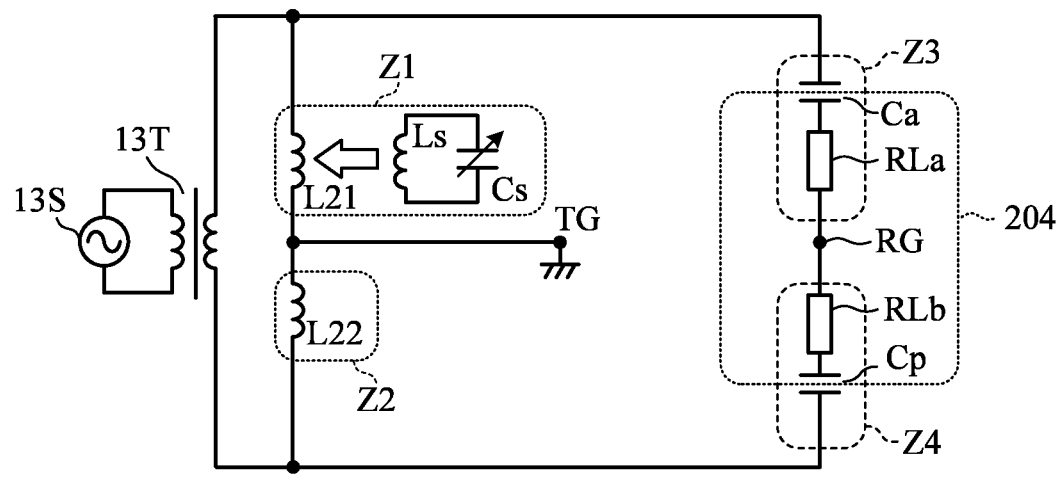
FIG. 22 is an equivalent circuit diagram of a power transfer system according to a twelfth embodiment.

FIG. 22 is an equivalent circuit diagram of a power transfer system 312 according to a twelfth embodiment.

In the power transfer system 311 of the eleventh embodiment illustrated in FIG. 21, the secondary coil of the step-up transformer 13T has the lead terminal connected to the reference potential point. The power transfer system 312 illustrated in FIG. 22 has a configuration where the secondary coil does not have a lead terminal.

In the power transfer system 312 illustrated in FIG. 22, a series connection circuit formed by a first inductor L21 and a second inductor L22 is connected in parallel with the secondary coil of the step-up transformer 13T, so that the first inductor L21 and a parasitic capacitance form the impedance Z1 (first element) and the second inductor L22 and a parasitic capacitance form the impedance Z2 (second element).

A bridge circuit formed by Z1 to Z4 is connected to the secondary side of the step-up transformer 13T, where Z3 represents an impedance of a series circuit formed by the capacitance Ca and the load RLa, and Z4 represents an impedance of a series circuit formed by the capacitance Cp and the load RLb. A balance condition of this bridge circuit can be expressed as $Z1 \times Z4 = Z2 \times Z3$. When this balance condition is satisfied, a potential difference between the transmitting-device-side reference potential point TG and the receiving-device-side reference potential point RG is 0.

With this configuration, as compared to the power transfer system 311 illustrated in FIG. 21 where the first secondary coils and a parasitic capacitance form the impedance Z1 and the second secondary coil ns2 and a parasitic capacitance form the impedance Z2, it is easier to inductively couple the LC parallel circuit formed by the inductor Ls and the variable capacitor Cs to the first inductor L21 and adjust the impedance of the impedance Z1 (first element).

Figure 23:
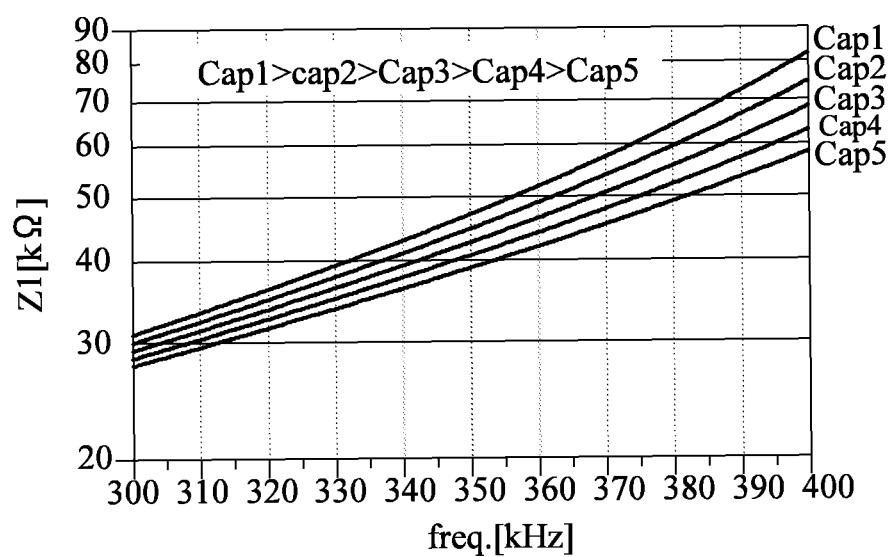
FIG. 23 is a diagram showing an impedance characteristic of an impedance Z1 in the power transfer system.

FIG. 23 is a diagram showing an impedance characteristic of the impedance Z1 in the power transfer system 312. Referring to FIG. 23, the vertical axis represents the impedance of the impedance Z1, and the horizontal axis represents the frequency of a high-frequency voltage applied by the high-frequency voltage generating circuit 13S. FIG. 23 shows that by varying the capacitance value of the variable capacitor Cs, the impedance of the impedance Z1 varies in the range of induction.

Figure 24:
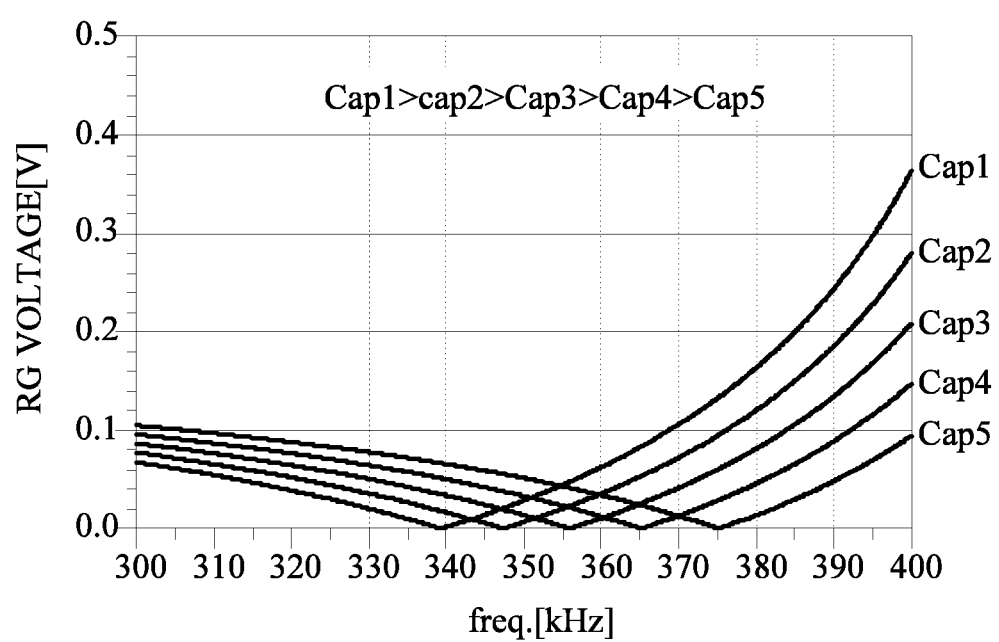
FIG. 24 is a diagram showing a frequency characteristic of a potential of a receiving-device-side passive electrode of the power transfer system.

FIG. 24 is a diagram showing a frequency characteristic of a potential of a receiving-device-side passive electrode of the power transfer system 312. Referring to FIG. 24, the vertical axis represents the potential at the receiving-device-side reference potential point RG, and the horizontal axis represents the frequency of a high-frequency voltage applied by the high-frequency voltage generating circuit 13S. FIG. 24 shows that by setting the capacitance value of the variable capacitor Cs for a specific frequency, the potential at the receiving-device-side reference potential point RG can be reduced.

Thirteenth Embodiment

The first to twelfth embodiments each describe a configuration with which the balance condition of the bridge circuit satisfies $Z1 \times Z4 = Z2 \times Z3$. The thirteenth embodiment will describe a configuration with which the balance condition $Z1 \times Z4 = Z2 \times Z3$ is not fully satisfied but the balance condition $Z1 \times Z4 = Z2 \times Z3$ can be nearly satisfied.

Figure 25A:
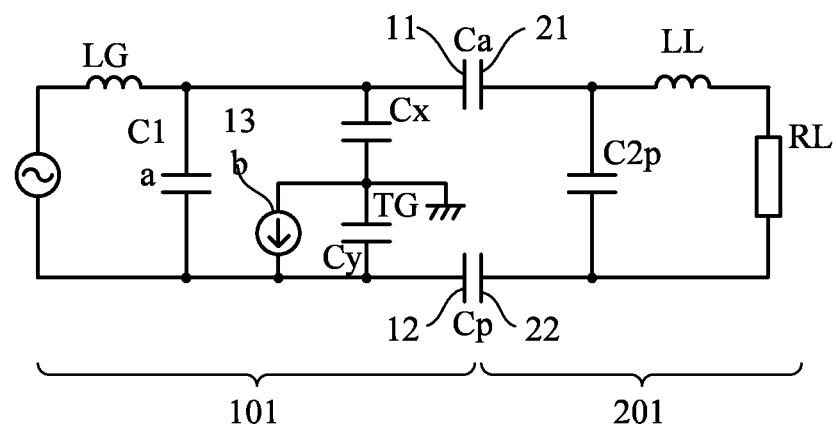
FIG. 25A is a circuit diagram of a power transfer system according to a thirteenth embodiment.
Figure 25B:
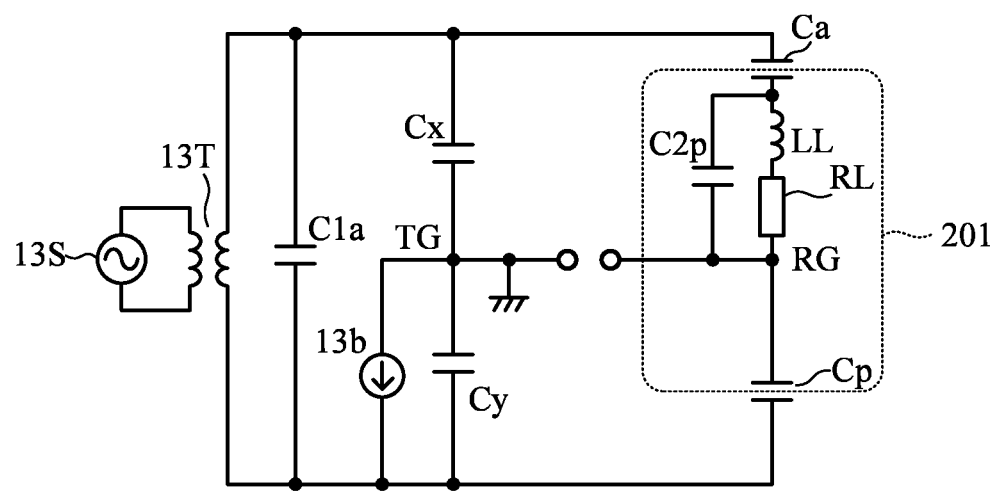
FIG. 25B is an equivalent circuit diagram of the power transfer system illustrated in FIG. 25A.

FIG. 25A is a circuit diagram of a power transfer system according to a thirteenth embodiment. FIG. 25B is an equivalent circuit diagram of the power transfer system illustrated in FIG. 25A. The capacitances Ca and Cp, the load RL, the inductor LL, and the inductor LG in a power transfer system 313 are the same as those in the embodiments described above. Capacitors C1a and C2p are connected to the inductors LG and LL, respectively.

The capacitor Cx is connected between the active electrode 11 and the transmitting-device-side reference potential point TG, and the capacitor Cy is connected between the passive electrode 12 and the transmitting-device-side reference potential point TG. An adjustment constant-current source 13b is connected to the transmitting-device-side reference potential point TG. The adjustment constant-current source 13b is a current source that injects a cancellation signal into the transmitting-device-side reference potential point TG. By adjusting the amplitude and phase, the adjustment constant-current source 13b makes setting such that the balance condition (i.e., a condition that satisfies Z1×Z4=Z2×Z3 described above) is nearly satisfied. Specifically, the adjustment constant-current source 13b injects a cancellation signal such that a voltage ratio M=V1/V0<1 is satisfied, where V0 is a voltage generated between the transmitting-device-side reference potential point TG and the receiving-device-side reference potential point RG when the capacitor Cy is shorted, and V1 is a voltage generated when the capacitor Cy is opened.

The following description will show that when the voltage ratio M is less than 1, a potential difference between the reference potential points TG-RG can be kept small and a sufficient amount of transferred power can be achieved.

Figure 26:
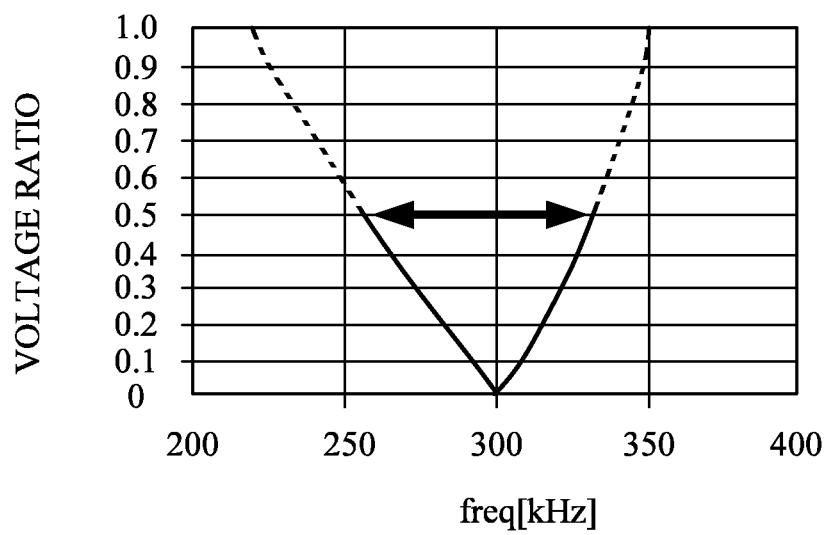
FIG. 26 is a diagram showing a frequency characteristic of a voltage ratio.
Figure 27:
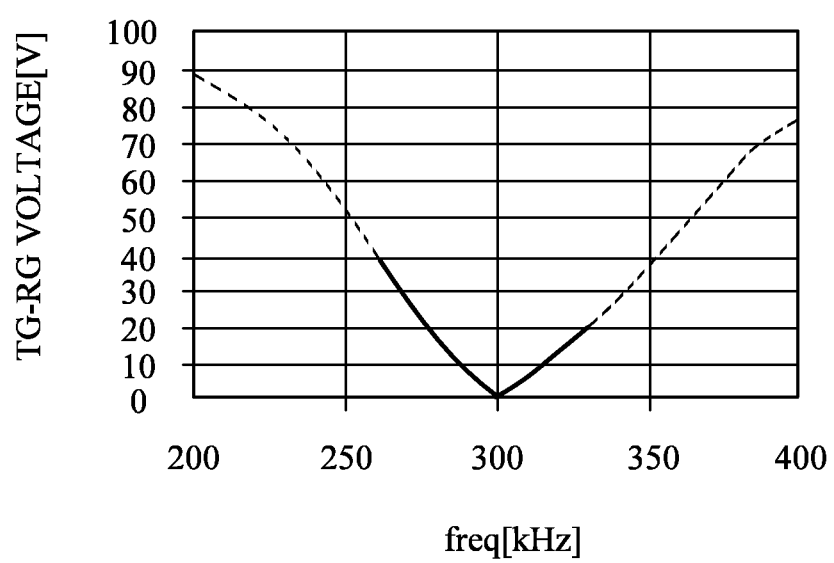
FIG. 27 is a diagram showing a frequency characteristic of a voltage between reference potential points TG-RG.
Figure 28:
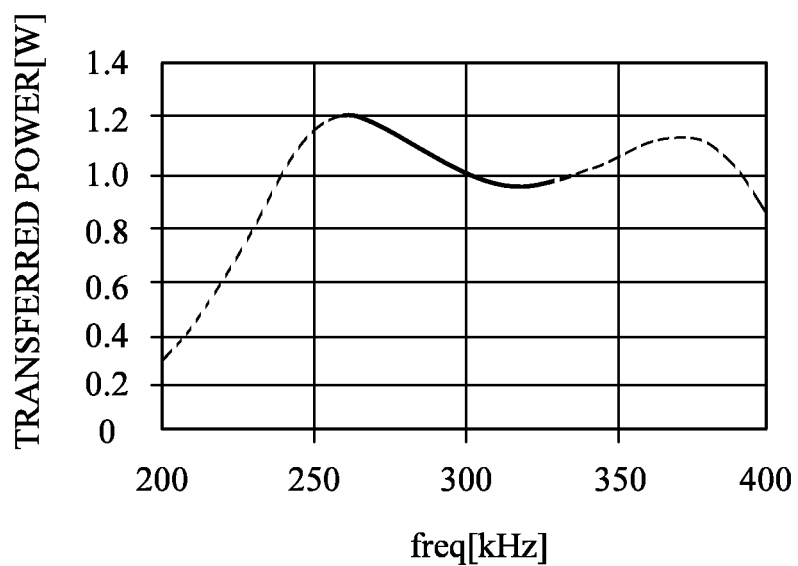
FIG. 28 is a diagram showing a frequency characteristic of transferred power.

FIG. 26 is a diagram showing a frequency characteristic of the voltage ratio M. FIG. 27 is a diagram showing a frequency characteristic of a voltage between the reference potential points TG-RG. FIG. 28 is a diagram showing a frequency characteristic of transferred power. The diagrams of FIGS. 26 to 28 show a result of simulation where, in FIGS. 25A and 25B, Ca=12 pF, C1a=10 pF, C2p=10 pF, LG=14.19 mH, LL=14.07 mH, RL=15.32 kΩ, Cx=2 pF, and Cy=10 pF, and the adjustment constant-current source 13b injected a cancellation signal of 1.34 mA.

Referring to FIG. 26, the vertical axis represents the voltage ratio M, and the horizontal axis represents the frequency of a high-frequency voltage applied by the high-frequency voltage generating circuit 13S. Referring to FIG. 27, the vertical axis represents the voltage between the reference potential points TG-RG, and the horizontal axis represents the frequency of a high-frequency voltage applied by the high-frequency voltage generating circuit 13S. Referring to FIG. 28, the vertical axis represents transferred power, and the horizontal axis represents the frequency of a high-frequency voltage applied by the high-frequency voltage generating circuit 13S. As shown in FIGS. 26 to 28, when the frequency of a high-frequency voltage applied by the high-frequency voltage generating circuit 13S is about 300 kHz, a transferred power of 1 W can be obtained and a voltage between the reference potential points TG-RG is about 0 V. The voltage ratio M here is 0. If M<1/2, the corresponding frequency range is from about 260 kHz to about 330 kHz, so that the TG-RG voltage can be about 0 V to about 40 V and the transferred power can fall within the range of about 0.95 W to about 1.2 W. However, to make the amount of variation in the reference potential on the receiving side smaller than that with the conventional configuration (where the transmitting-side passive electrode is connected to the transmitting-side reference potential), the present configuration may be used and M may be set to satisfy M<1.

Fourteenth Embodiment

Figure 29A:
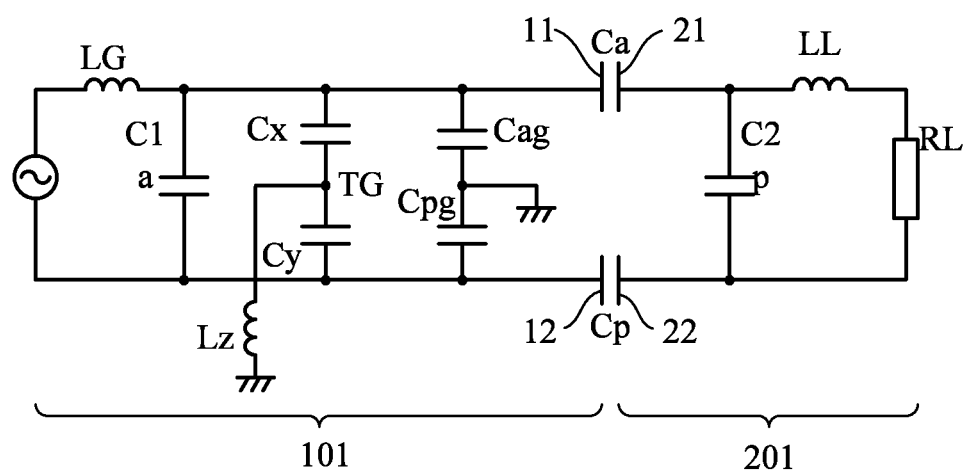
FIG. 29A is a circuit diagram of a power transfer system according to a fourteenth embodiment.
Figure 29B:
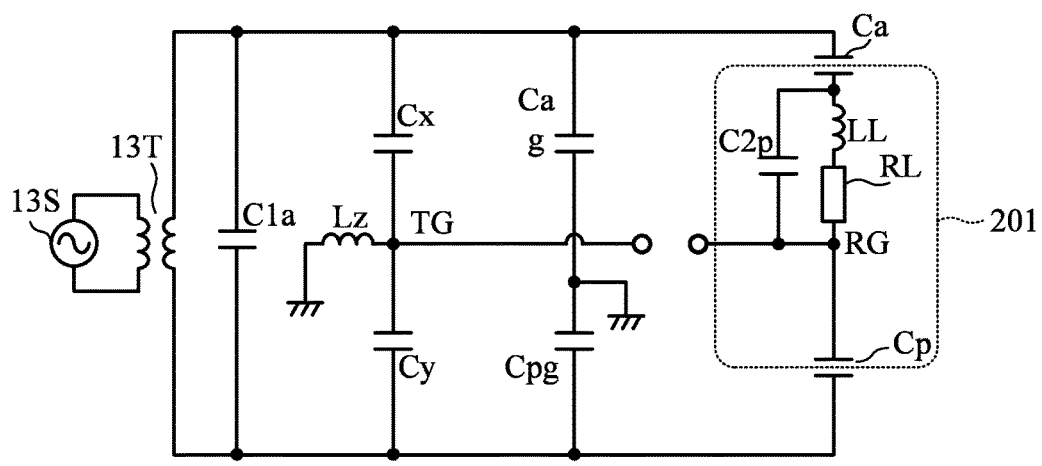
FIG. 29B is an equivalent circuit diagram of the power transfer system illustrated in FIG. 29A.

FIG. 29A is a circuit diagram of a power transfer system according to a fourteenth embodiment. FIG. 29B is an equivalent circuit diagram of the power transfer system illustrated in FIG. 29A. The capacitances Ca and Cp, the load RL, the inductor LL, the inductor LG, and the capacitors C1a and C2p in a power transfer system 314 are the same as those in the thirteenth embodiment.

The capacitor Cx is connected between the active electrode 11 and the transmitting-device-side reference potential point TG, and the capacitor Cy is connected between the passive electrode 12 and the transmitting-device-side reference potential point TG. The transmitting-device-side reference potential point TG is connected via an inductor Lz to the ground. Capacitors Cag and Cpg connected in series are connected in parallel with the capacitors Cx and Cy. A node between the capacitors Cag and Cpg is connected to the ground.

In this configuration, as in the thirteenth embodiment, for example, the inductance and capacitance of each element are adjusted such that the voltage ratio M=V1/V0<1 is satisfied. Thus, the balance condition (i.e., a condition that satisfies Z1×Z4=Z2×Z3 described above) is nearly satisfied.

The following description will show that when the voltage ratio M is less than 1, a potential difference between the reference potential points TG-RG can be kept small and a sufficient amount of transferred power can be achieved.

Figure 30:
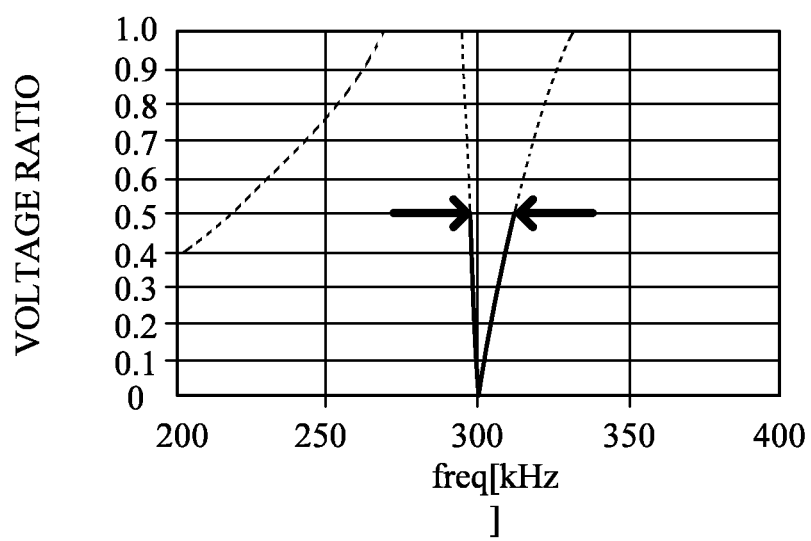
FIG. 30 is a diagram showing a frequency characteristic of the voltage ratio.
Figure 31:
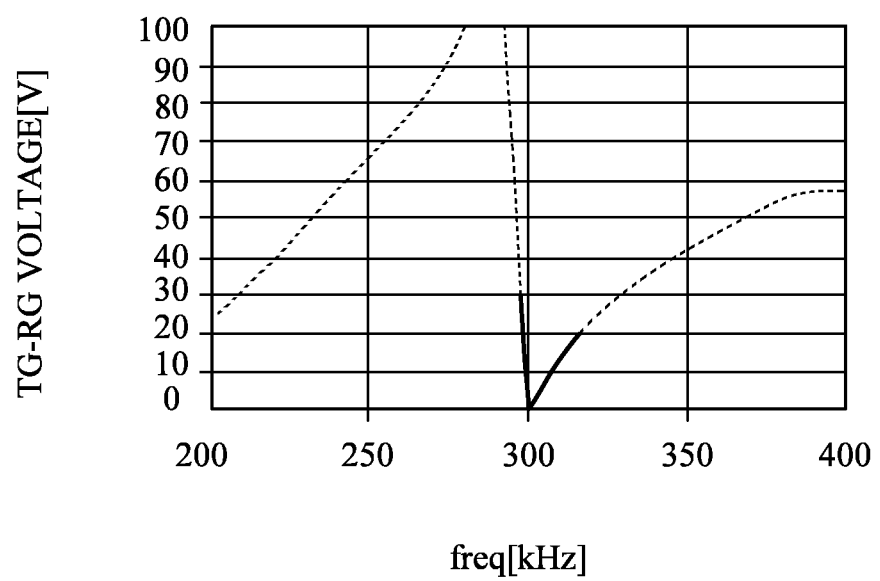
FIG. 31 is a diagram showing a frequency characteristic of a voltage between the reference potential points TG-RG.
Figure 32:
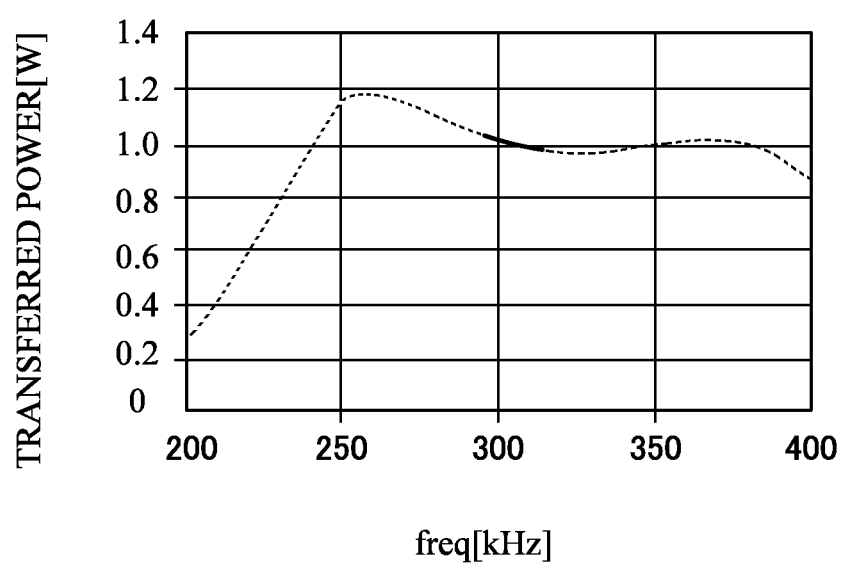
FIG. 32 is a diagram showing a frequency characteristic of transferred power.
Figure 33A:
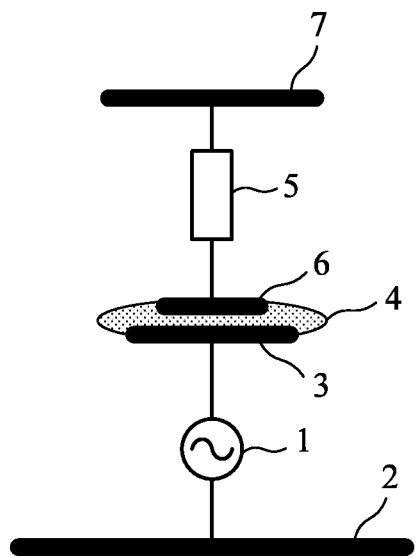
FIG. 33A illustrates a basic configuration of a power transfer system described in Patent Document 1.
Figure 33B:
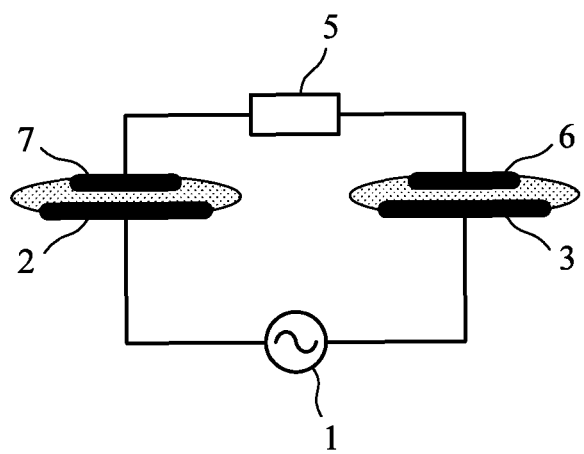
FIG. 33B illustrates a basic configuration of another power transfer system described in Patent Document 1.

FIG. 30 is a diagram showing a frequency characteristic of the voltage ratio M. FIG. 31 is a diagram showing a frequency characteristic of a voltage between the reference potential points TG-RG. FIG. 32 is a diagram showing a frequency characteristic of transferred power. The diagrams of FIGS. 30 to 32 show a result of simulation where, in FIGS. 29A and 29B, Ca=12 pF, C1a=5 pF, C2p=10 pF, LG=14.19 mH, LL=14.07 mH, RL=15.32 kΩ, Cx=6 pF, Cy=30 pF, Cag=2 pF, Cpg=10 pF, and Lz=31.27 mH.

The vertical axis and the horizontal axis in FIGS. 30, 31, and 32 are the same as those in FIGS. 26 to 28. As shown in FIGS. 30 to 32, when the frequency of a high-frequency voltage applied by the high-frequency voltage generating circuit 13S is about 300 kHz, a transferred power of 1 W can be obtained and a voltage between the reference potential points TG-RG is about 0 V. The voltage ratio M here is 0. If M<1/2, the corresponding frequency range is from about 295 kHz to about 315 kHz, so that the TG-RG voltage can be about 0 V to about 30 V and a transferred power of about 1.0 W can be obtained. However, to make the amount of variation in the reference potential on the receiving side smaller than that with the conventional configuration (where the transmitting-side passive electrode is connected to the transmitting-side reference potential), the present configuration may be used and M may be set to satisfy M<1.

As described in the first to twelfth embodiments, even when the balance condition of the bridge circuit does not satisfy Z1×Z4=Z2×Z3, if the balance condition Z1×Z4=Z2×Z3 is nearly satisfied as in the thirteenth or fourteenth embodiment described above, the voltage between the reference potential points TG-RG can be about 0 V and the operation of the load circuit on the receiving device side during power transfer can be stabilized.

The embodiments described above are representative examples, and it is obvious that they may be combined appropriately. For example, the configuration of the power receiving device in the power transfer system represented by the equivalent circuit of FIG. 14 may be replaced by the configuration illustrated in FIGS. 10 and 11.

Although a variable impedance and a fixed impedance are provided in the embodiments described above, these impedances are merely an example and may be either fixed or variable. For adjusting the impedance, the variable impedance may be provided at the adjustment point or at a point related to the adjustment point.

REFERENCE SIGNS LIST

C2: variable capacitor
Ca, Cp: coupling capacitance
Cm: mutual capacitance
CNV: DC-DC converter
D1, D2: diode
DB: diode bridge circuit
RC1: step-up circuit
RC2: step-down circuit
RG: receiving-device-side reference potential point
RL: load
RLa, RLb: load
S1: adjustment switching circuit (connection switching circuit)
SB: secondary battery
TG: transmitting-device-side reference potential point
XG: step-up transformer
XL: step-down transformer
10: housing
11: transmitting-device-side active electrode
12: transmitting-device-side passive electrode
13a: adjustment alternating-current source
13S: high-frequency voltage generating circuit
13T: step-up transformer
14: power amplifying circuit
15: guard electrode
16: series circuit
16x: first element
16y: second element
17: auxiliary electrode
18: control circuit
20: housing
21: receiving-device-side active electrode
22: receiving-device-side passive electrode
23: load circuit
23T: step-down transformer
31: high-frequency voltage generating unit
32: power amplifying circuit
33: step-up transformer
41: step-down transformer
42: rectifying circuit
43: load
101 to 103, 107: power transmitting device
201, 204, 205: power receiving device
301 to 312: power transfer system

The invention claimed is:

1. A power transfer system comprising:
a power transmitting device having a transmitting-device-side first electrode, a transmitting-device-side second electrode, and a feeding circuit configured to feed an alternating voltage between the transmitting-device-side first electrode and the transmitting-device-side second electrode, wherein
the power transmitting device includes a series circuit between the transmitting-device-side first electrode and the transmitting-device-side second electrode, the series circuit including a first element that is an electrical circuit having an impedance connected to the transmitting-device-side first electrode and a second element that is an electrical circuit having an impedance, the first element and the second element being connected in series;
a transmitting-device-side reference potential point connected to a reference potential of the transmitting device, the transmitting-device-side reference potential point being a node between the first element and the second element of the series circuit;
a power receiving device having the receiving-device-side first electrode, a receiving-device-side second electrode, and a load circuit configured to receive an alternating voltage generated between the receiving-device-side first and second electrodes; and
the series circuit is configured such that a balance condition $Z1 \times Z4 = Z2 \times Z3$ is satisfied at a fundamental frequency of the alternating voltage, where $Z1$ is the impedance of the first element, $Z2$ is the impedance of the second element, $Z3$ is an impedance of the series circuit including a capacitance between the transmitting-device-side first electrode and the receiving-device-side first electrode and the load circuit of the power receiving device, and $Z4$ is an impedance including a capacitance between the transmitting-device-side second electrode and the receiving-device-side second electrode of the power receiving device.

2. The power transfer system according to claim 1, wherein a receiving-device-side reference potential point is connected to a reference potential of the receiving device, and a node connected between the load circuit and the receiving-device-side second electrode or a midpoint of the load circuit.

3. The power transfer system according to claim 2, wherein the second element of the series circuit has a capacitance connected or formed between the transmitting-device-side second electrode and the transmitting-device-side reference potential point; and
the balance condition is satisfied when a voltage ratio $V1/V0$ is less than 1, where $V0$ is a first voltage generated between the reference potential of the transmitting device and the reference potential of the receiving device when the capacitance is shorted, and $V1$ is a second voltage generated between the reference potential of the transmitting device and the reference potential of the receiving device when the capacitance is opened.

4. The power transfer system according to claim 2, wherein the reference potential on the transmitting device side is a ground potential.

5. The power transfer system according to claim 1, wherein the reference potential on the transmitting device side is a ground potential.

6. The power transfer system according to claim 2, wherein a capacitance is connected or formed between the transmitting-device-side reference potential point and the receiving-device-side reference potential point.

7. The power transfer system according to claim 1, wherein the impedance of the first element is formed by a fixed impedance and a variable impedance connected in parallel with the fixed impedance;
the impedance of the second element is formed by a fixed impedance and a variable impedance connected in parallel with the fixed impedance; and
the variable impedances are set such that the balance condition is satisfied at the fundamental frequency.

8. The power transfer system according to claim 1, wherein the impedances $Z1$, $Z2$, $Z3$, and $Z4$ are set such that the balance condition is satisfied at a third harmonic frequency of the alternating voltage.

9. The power transfer system according to claim 1, further comprising a circuit including a current source electrically connected to the transmitting-device-side reference potential point and that injects a cancellation signal that reduces components caused by deviation from the balance condition.

10. The power transfer system according to claim 1, wherein the transmitting-device-side first electrode is surrounded by and insulated from the transmitting-device-side second electrode.

11. The power transfer system according to claim 10, further comprising a transmitting-device-side third electrode that surrounds and is insulated from the transmitting-device-side second electrode.

12. The power transfer system according to claim 11, wherein the transmitting-device-side third electrode is connected to the reference potential of the power transmitting device.

13. A power transfer system comprising:
a power transmitting device having a transmitting-device-side first electrode, a transmitting-device-side second electrode; and
a power receiving device having a receiving-device-side first electrode, a receiving-device-side second electrode, and a load circuit configured to receive an alternating voltage generated between the receiving-device-side first electrode and the receiving-device-side second electrode,
wherein:
the power transmitting device includes a series circuit between the transmitting-device-side first electrode and the transmitting-device-side second electrode, the series circuit including a first element connected to the transmitting-device-side first electrode and a second element, the first element and the second element being connected in series,
a transmitting-device-side reference potential point connected to a reference potential of the transmitting device, the transmitting-device-side reference potential point being a node between the first element and the second element of the series circuit,
the power transmitting device includes a feeding circuit comprising an alternating voltage generating circuit configured to feed an alternating voltage between the transmitting-device-side first and second electrodes and a transformer having a primary winding connected to the alternating voltage generating circuit and a secondary winding connected between the transmitting-device-side first electrode and the transmitting-device-side second electrode, and
the series circuit is configured such that a balance condition $Z1 \times Z4 \approx Z2 \times Z3$ is satisfied at a fundamental frequency of the alternating voltage, where Z1 is an impedance of the first element, Z2 is an impedance of the second element, Z3 is an impedance of the series circuit including a capacitance between the transmitting-device-side first electrode and the receiving-device-side first electrode and the load circuit of a power receiving device, and Z4 is an impedance including a capacitance between the transmitting-device-side second electrode and the receiving-device-side second electrode of the power receiving device.

14. The power transfer system according to claim 13, wherein:
the secondary winding has a lead terminal configured to form a first secondary winding between the transmitting-device-side first electrode and the lead terminal, and form a second secondary winding between the transmitting-device-side second electrode and the lead terminal;
the impedance of the first element is formed by an impedance of the first secondary winding and an impedance of a first capacitor connected in parallel with the first secondary winding; and
the impedance of the second element is formed by an impedance of the second secondary winding and an impedance of a second capacitor connected in parallel with the second secondary winding.

15. The power transfer system according to claim 13, wherein
the lead terminal is a center tap of the secondary winding; and
the secondary winding has:
a first lead terminal of the first secondary winding, and
a second lead terminal of the second secondary winding,
the power transfer system further comprises a connection switching circuit configured to switch connection of the transmitting-device-side reference potential to the center tap and one of the first and second lead terminals.

16. The power transfer system according to claim 13, wherein
the secondary winding of the transformer has a lead terminal configured to form a first secondary winding between the transmitting-device-side first electrode and the lead terminal and a second secondary winding between the transmitting-device-side second electrode and the lead terminal,
the impedance of the first element is formed by an impedance of the first secondary winding,
the impedance of the second element is formed by an impedance of the second secondary winding, and
the power transfer system further comprises an inductor inductively coupled to part of the first secondary winding, and a capacitor connected to the inductor.

17. The power transfer system according to claim 13,
wherein the feeding circuit comprises a series connection circuit formed by a first inductor and a second inductor and connected in parallel with the secondary winding of the transformer,
wherein the impedance of the first element is formed by an impedance of the first inductor,
wherein the impedance of the second element is formed by an impedance of the second inductor, and
wherein the power transfer system further comprises a third inductor inductively coupled to part of the first inductor, and a capacitor connected to the third inductor.

* * * * *